(12) United States Patent
Meir

(10) Patent No.: US 6,275,946 B1
(45) Date of Patent: Aug. 14, 2001

(54) INTERNAL UPS CARD FOR A COMPUTER

(75) Inventor: Ronen Meir, Ashkelon (IL)

(73) Assignee: Guardian On Board Ltd., Herzlia (IL)

( * ) Notice: Subject to any disclaimer, the term of this patent is extended or adjusted under 35 U.S.C. 154(b) by 0 days.

(21) Appl. No.: 09/077,025

(22) PCT Filed: Nov. 20, 1996

(86) PCT No.: PCT/IL96/00156

§ 371 Date: Mar. 12, 1999

§ 102(e) Date: Mar. 12, 1999

(87) PCT Pub. No.: WO97/21267

PCT Pub. Date: Jun. 12, 1997

(30) Foreign Application Priority Data

Nov. 23, 1995 (IL) .......................................................... 116111

(51) Int. Cl.[7] .............................. G06F 1/28; G06F 11/07
(52) U.S. Cl. .............................. 713/300; 714/14; 307/64; 307/66
(58) Field of Search ...................................... 713/300, 340, 713/2; 714/14; 361/683, 752; 363/16, 37, 131; 323/215; 710/102, 126; 375/222; 307/64, 66, 85, 86, 150

(56) References Cited

U.S. PATENT DOCUMENTS

| | | | |
|---|---|---|---|
| 4,184,197 | 1/1980 | Cuk et al. ............................... | 363/16 |
| 4,675,538 | 6/1987 | Epstein . | |
| 4,709,318 | 11/1987 | Gephart et al. ......................... | 363/37 |
| 4,868,832 | 9/1989 | Marrington et al. .................... | 371/66 |
| 4,876,460 * | 10/1989 | Johnson . | |
| 4,890,217 | 12/1989 | Conway ................................. | 363/143 |
| 4,977,537 | 12/1990 | Dias et al. ............................. | 364/900 |
| 5,019,717 * | 5/1991 | McCurry et al. . | |
| 5,193,176 | 3/1993 | Brandin ................................. | 395/575 |
| 5,229,650 | 7/1993 | Kita et al. ............................. | 307/66 |
| 5,319,571 * | 6/1994 | Langer et al. . | |
| 5,430,867 | 7/1995 | Gunji ..................................... | 395/575 |
| 5,901,057 * | 5/1999 | Brand et al. . | |

FOREIGN PATENT DOCUMENTS

| | | |
|---|---|---|
| 0433979 | 6/1991 | (EP) . |
| 2 262 170 | 6/1993 | (GB) . |
| WO 95/17777 | 6/1995 | (WO) . |
| WO 96/38774 | 12/1996 | (WO) . |

OTHER PUBLICATIONS

Cheng, D., "Design of a Switching Mode Power Supply with UPS Features", Proceedings of the 1995 IEEE Tencon. Int'l Conference on Microelectronics and VLSI, Nov. 6, 1995, pp. 444–447, XP000884279, USA.

Pill, M., "Powerful Saviours", ICL Today, vol. 6, No. 5, Feb. 1991, pp. 42–43, XP000884016, UK.

Harold, P., "Units Power PCs In Rough Times", EDN, vol. 34, No. 11, May 1989, pp. 73–84, XP000877007, USA.

"Constraints of Power", Communications Engineering, vol. 9, No. 6, Jul. 1987, pp. 19–27, XP0007884078, UK.

* cited by examiner

Primary Examiner—Gopal C. Ray
(74) Attorney, Agent, or Firm—Nath & Associates PLLC; Gary M. Nath; Marvin C. Berkowitz

(57) ABSTRACT

An uninterrupted power supply (UPS) for a computer having a data storage element and an associated monitor, the computer operating on power supplied by an internal switch mode power supply (SMPS) system receiving line power, characterized in that the UPS comprises an internal device for installation inside the computer and the internal device supplies back up power and protection to the computer and to the monitor from power abnormalities and noises.

29 Claims, 18 Drawing Sheets

6,275,946 B1

INTERNAL UPS CARD FOR A COMPUTER

BACKGROUND OF THE INVENTION

Modern personal computers (PC) are increasingly used in companies, offices and by private users. Their failure or malfunction may cause severe and costly damage or expensive loss of data and information. Unfortunately, the quality of utility power does not guaranty reliable operation of personal computers. Outages, abnormal voltage and transients disturb or halt the operation, erase precious data and cause deterioration of components and hardware failures.

SUMMARY OF THE INVENTION

The present invention relating to an internal UPS card is designed to supply power to personal computers and monitors, such as super VGA color screens, and protect the computer and screen against all power disruptions including outages. This card is installed inside the computer, for example, in the conventional bus slots and requires only one or two bus slots, and has the power to back up both the computer and the monitor or screen. This is made possible by using a very small inverter that inverts for example a 12 V slim battery (about 20 mm) to high DC or AC voltage, typically 280 V, for DC or 220/110 V for AC, with high efficiency. The inverter functions at high frequency, 15 to 200 KHz, preferably about 25 KHz, and very high efficiency. This is achieved by using a low profile planar transformer such as a ferrite transformer and Mosfet transistors with very low Rds ON. The high-frequency step-up voltage from the output of the planar transformer is rectified by ultra fast or fast diodes. In this way we get a DC voltage output that can operate computers and monitors or screens. Similarly, an AC inverter with planar transformer can produce a high AC voltage. The computers and screens can function directly from the DC or AC power generated.

The UPS card of this invention preferably does not have a power switch of its own, but is turned on and off by the PC power switch, together with the computer. In this way it is easy to power up the card and simplifies to a minimum its installation, which takes less than 2 minutes with proper instruction. However, it is possible for the UPS to be activated by an independent on/off switch which may be located on the UPS card bracket.

The card can also be installed inside the PC power supply (SMPS) with little change of size and wiring.

The invention will be better understood with reference to the following drawings in which:

DETAILED DESCRIPTION OF THE INVENTION

The invention relates to an uninterruptible power system (UPS) in the form of an internal card and more particularly to an internal card type UPS which can ensure that no data will be lost when power interruption occurs. The card provides backup power to the PC and to the screen so that they remain on and allow the user to save data on a data storage element, such as on a hard disc, and turn off the computer safely.

The internal card type UPS of this invention is particularly useful inside a computer having a data storage element, such as a hard or floppy disc and optionally other hardware such as an internal or external modem/fax and SVGA screen or other monitor. The computer receives DC voltage from an internal switch mode power supply (SMPS) system receiving line power. The internal card provides backup power when line power is disrupted or abnormal. The UPS card has a built-in battery and charger for charging said battery when the line power is available. The card also has means for actuating a DC to DC or DC to AC high voltage inverter that oscillates at a high frequency. The DC to DC inverter provides, after rectification, high DC voltage output to operate said computer and screen, when line power is outside the normal, desired range (normal=say 220 V or 110 V±x %).

The inverter typically uses a low profile transformer, typically a planar or regular ferrite, transformer which is small and can be placed on a printed circuit board, so the card type UPS is thin and can be installed in one PC slot, or can be installed inside the computer power supply (SMPS), by changing the PCB layout and size. The card can also short out 2 points when the main line is off or abnormal on the RS232 connector via a small jumper cable, and together with software can order server/stand alone computer to close files and down-load the server/stand alone and communication between the server and other computers. The internal UPS card of this invention can also be adapted not to need an external jumper cable.

Figure 1:
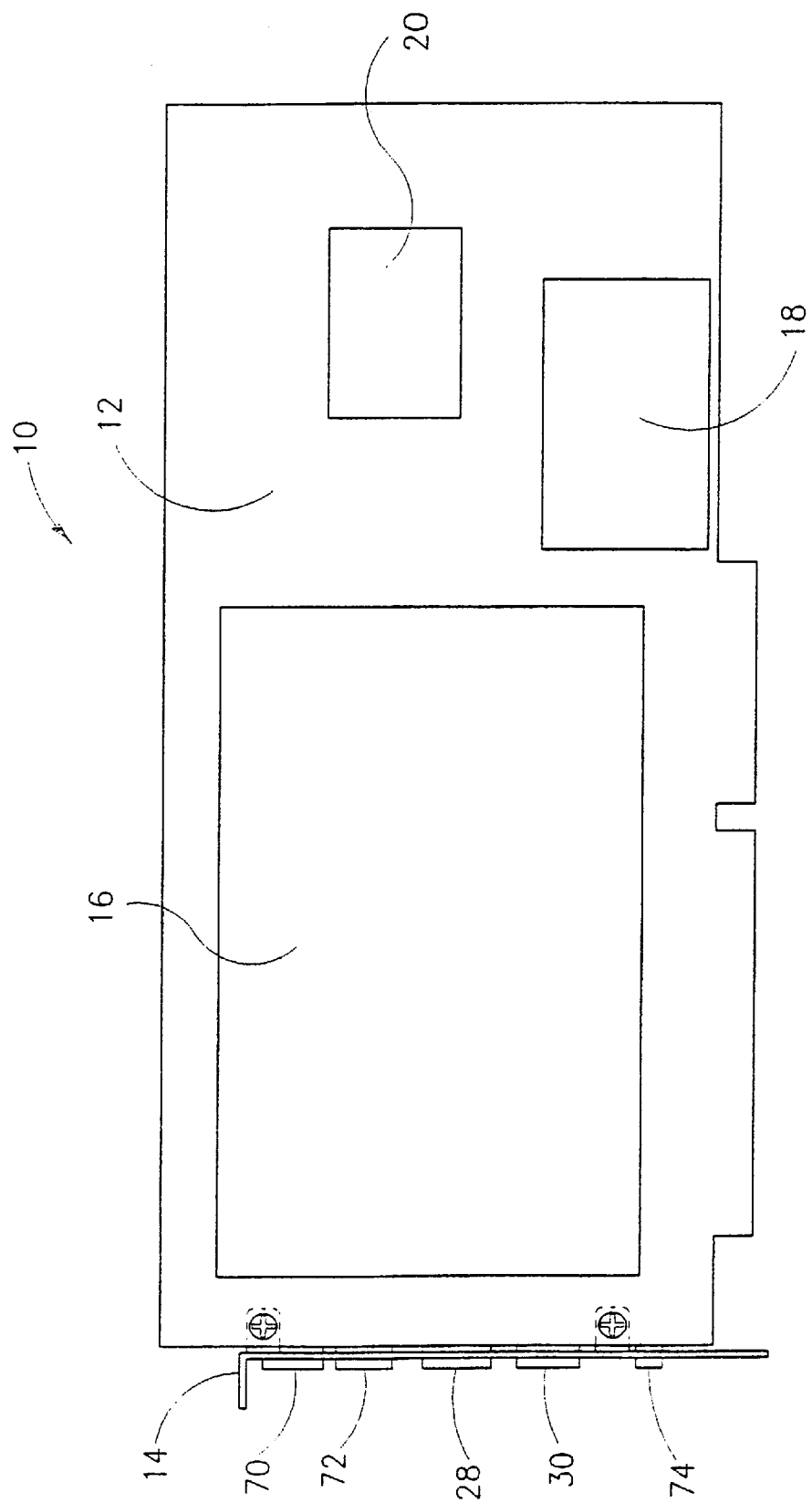
FIG. 1 is a schematic plan view of a UPS card constructed in accordance with one embodiment of the invention.
Figure 2B:
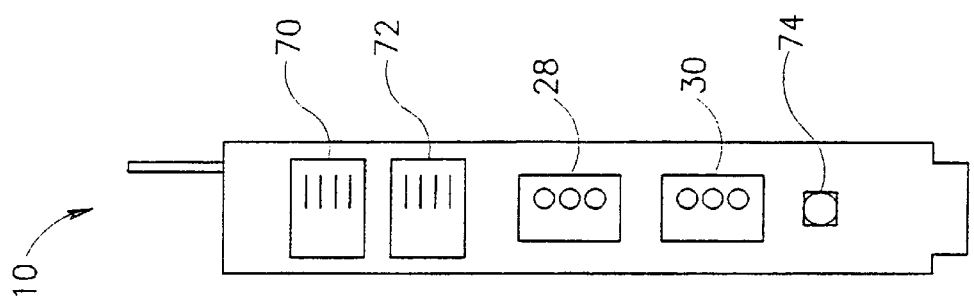
FIG. 2b is a front end view of the UPS card of FIG. 1.
Figure 2A:
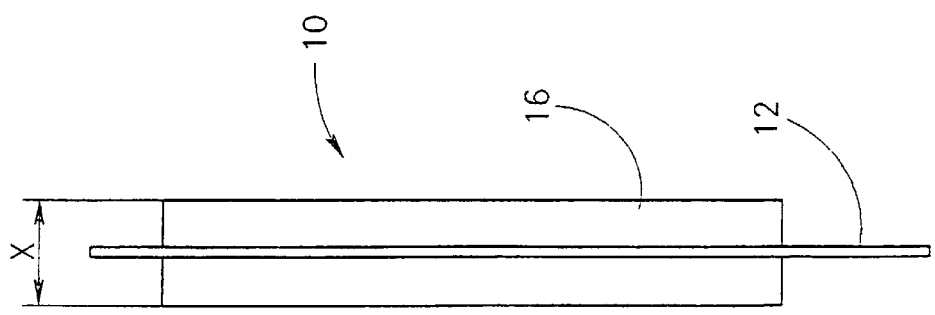
FIG. 2a is a rear end view of the UPS card of FIG. 1.

Referring now to FIGS. 1, 2a and 2b, there is shown schematically a UPS card 10 constructed and operative in accordance with one embodiment of the invention in respective plan, rear end and front end views. Card 10 includes among other things a printed circuit board 12 affixed to a metal plate 14 with connectors, as known, for insertion into a slot in a computer. Card 10 includes a battery 16, a planar transformer 18 and a battery charger 20.

Figure 3:
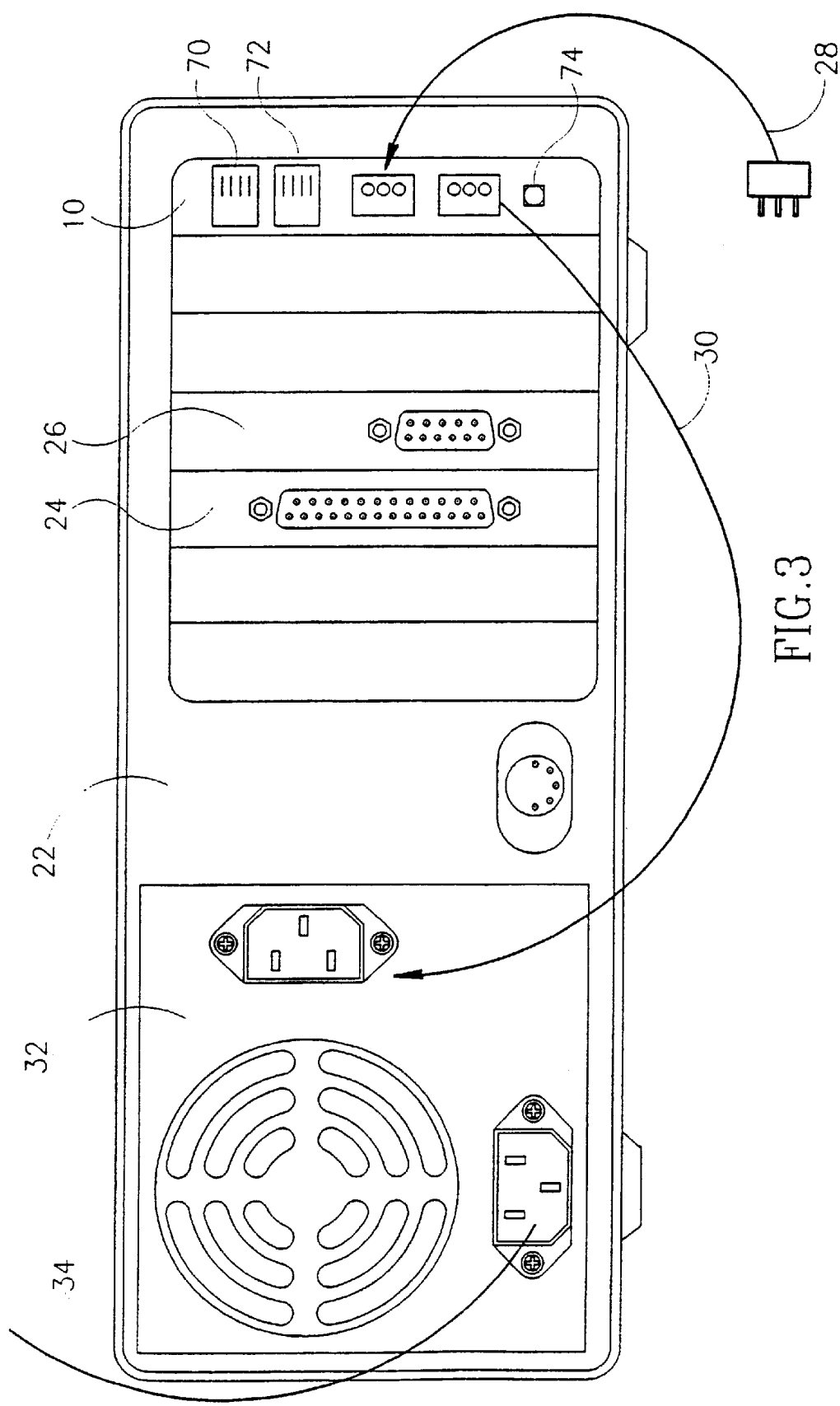
FIG. 3 is a schematic rear view of the illustration of a computer in which one embodiment of the UPS card of the present invention is installed.

It is one particular feature of the invention that UPS card 10 is narrow enough (as seen in FIG. 2a) to fit in one or two conventional bus slots in a computer. In FIG. 2a x can be approximately between 10–22 mm. FIG. 3 shows a rear view of a computer 22 with a UPS card 10 according to one embodiment of the invention inserted in a PC slot therein.

Computer 22 also includes a power supply 32 as well as conventional printer 24 and RS232 26 connectors.

Figure 14:
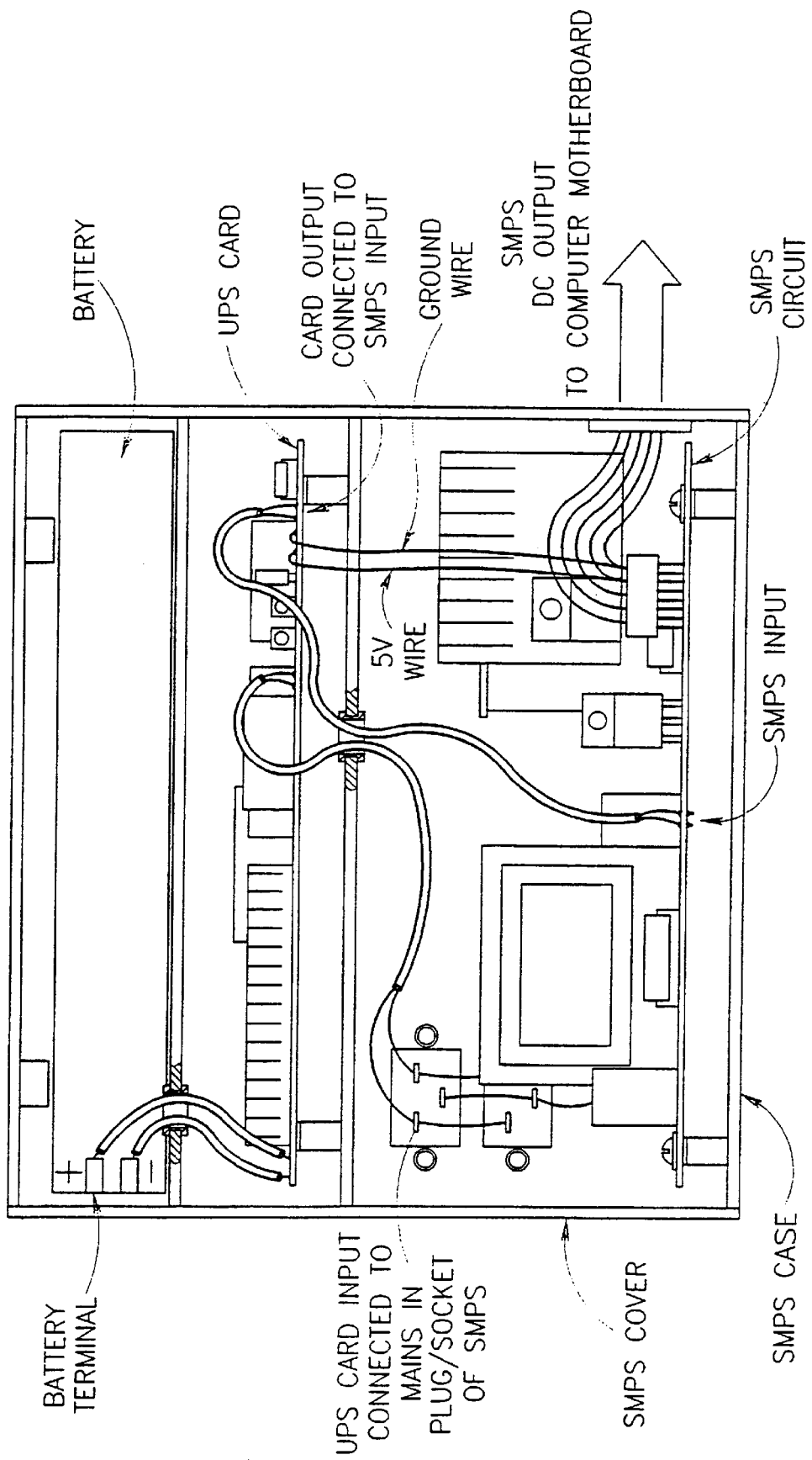
FIG. 14 is a schematic diagram of a UPS enclosed in the PC-SMPS.

The UPS card can be installed in any one of the free card slots in the computer. As shown in FIG. 3, the AC mains line 28 is connected directly to the UPS card 10, and a short jumper cable 30 connects the UPS card 10 to the computer power supply (SMPS) 32. From the power supply 32, a line 34 goes to the monitor (not shown). Thus, the current flows from the main line 28 into the UPS card 10, and out of the UPS card 10 into the power supply 32 which powers both the computer and the screen. Alternatively, the UPS card 10 may be coupled internally to SMPS 32 so no jumper cord is required, as shown in FIG. 14.

Figure 4A:
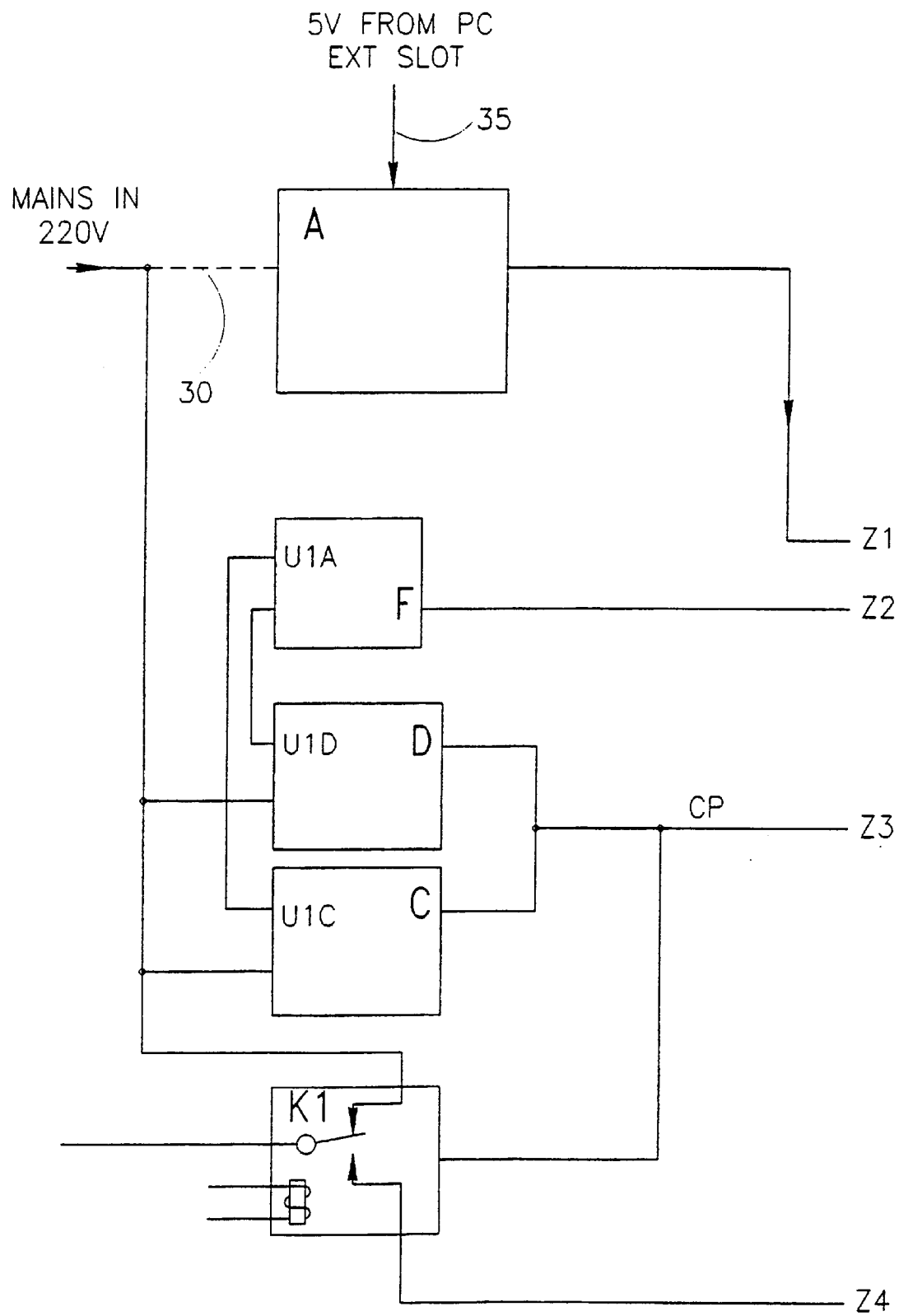
FIGS. 4A–4B are a block diagram of a UPS card in accordance with the invention.
Figure 4B:
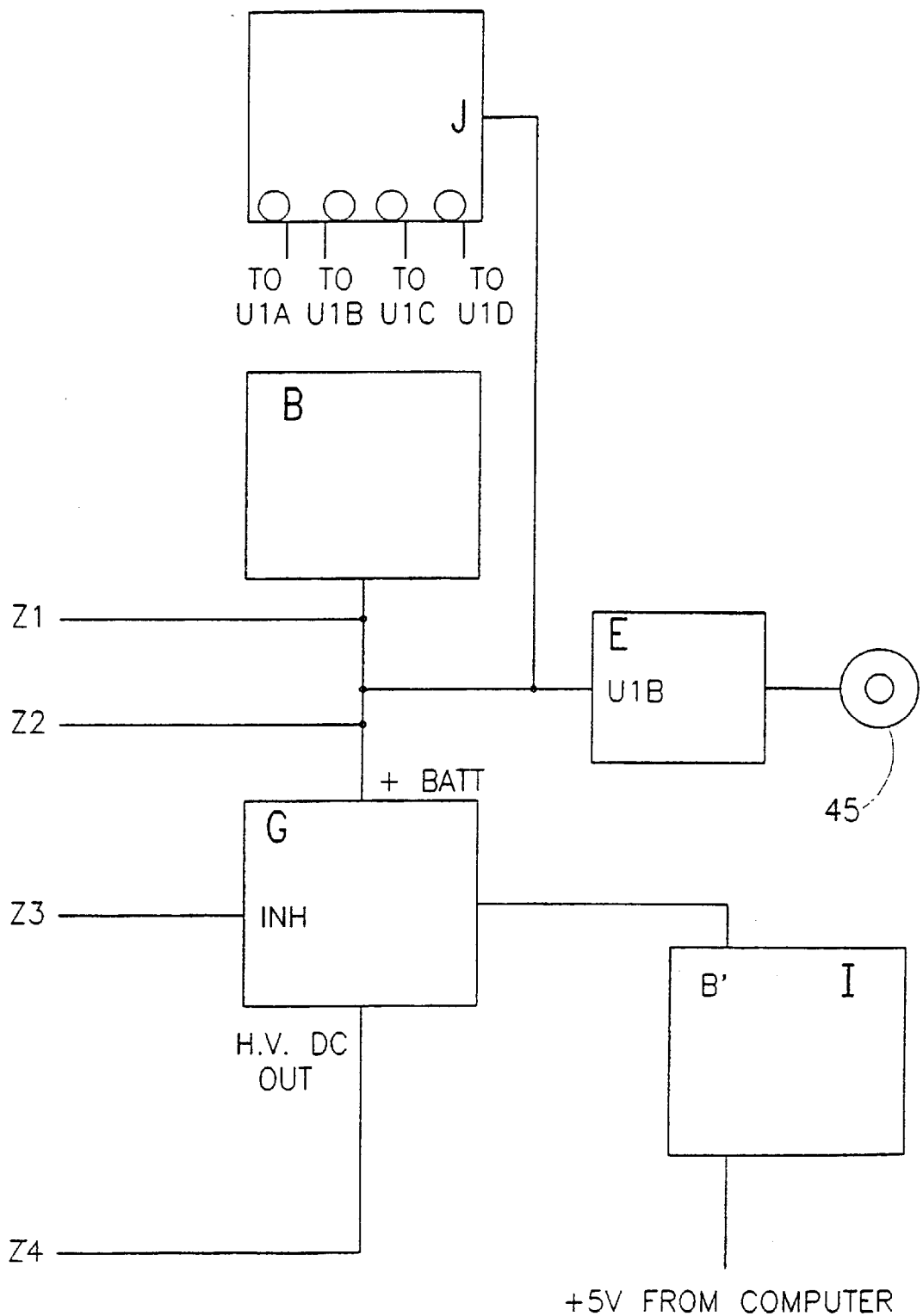
Figure 5A:
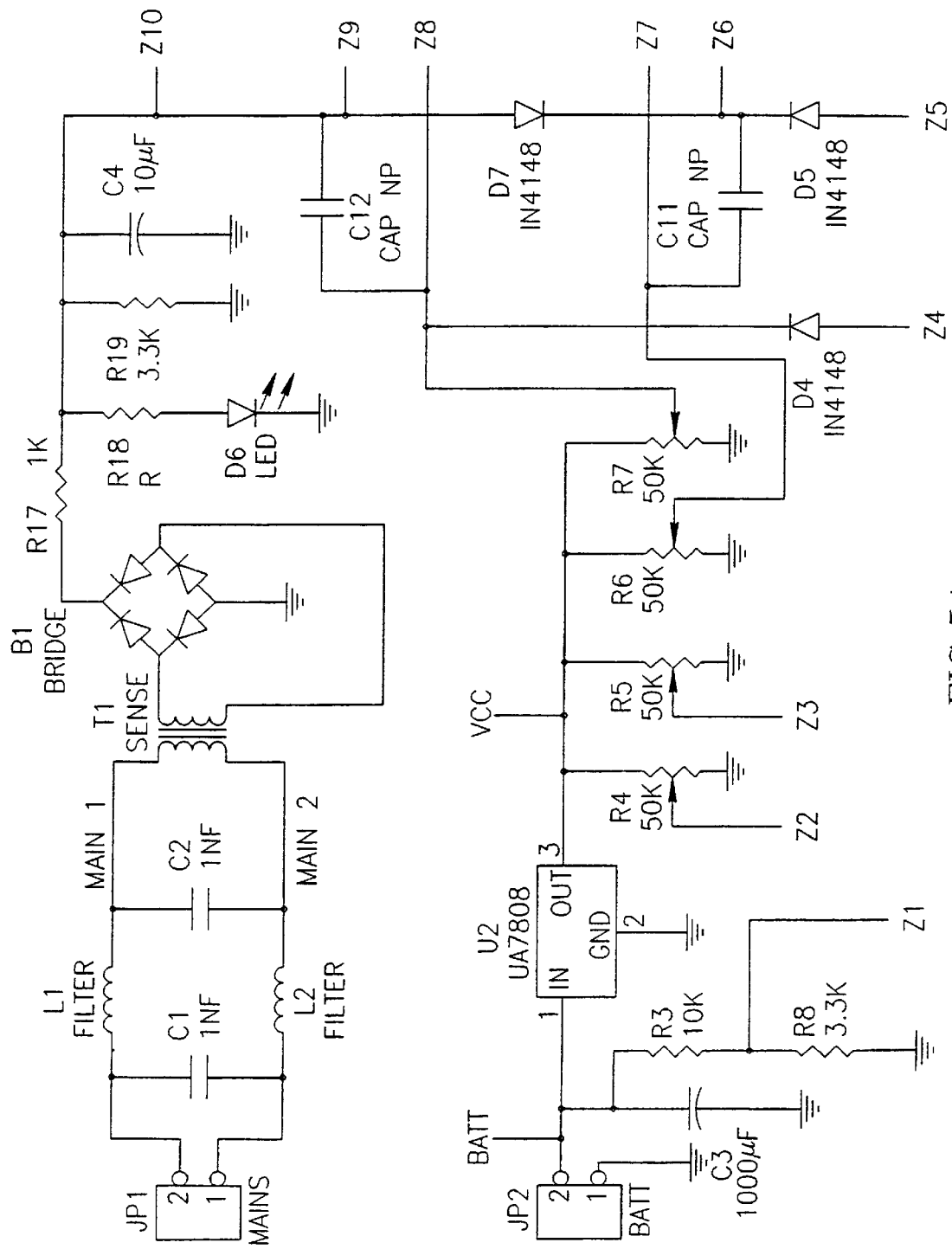
FIGS. 5A–5C are schematic diagrams of an electronic circuit including low/high voltage detector and low battery alarm means.
Figure 5B:
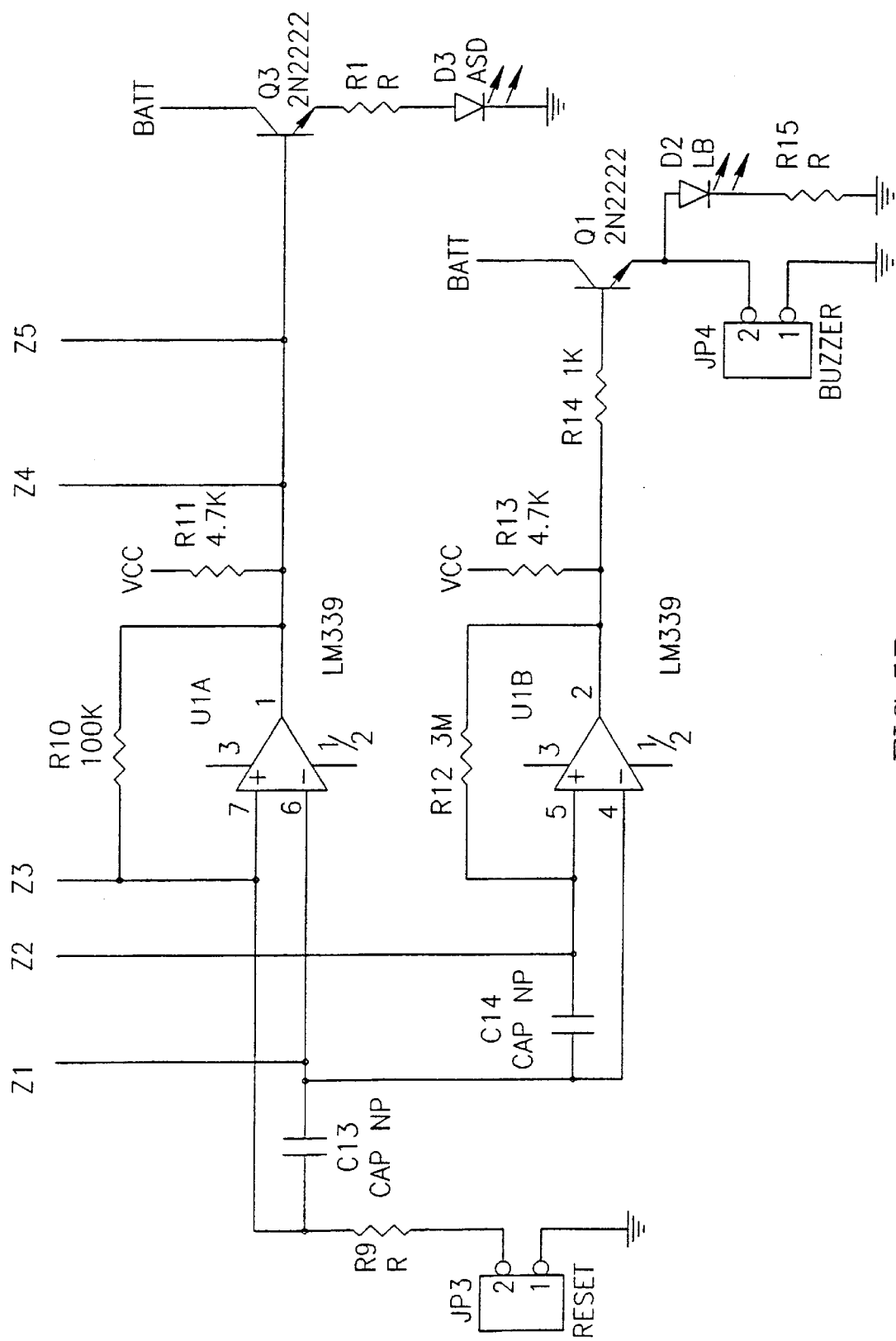
Figure 5C:
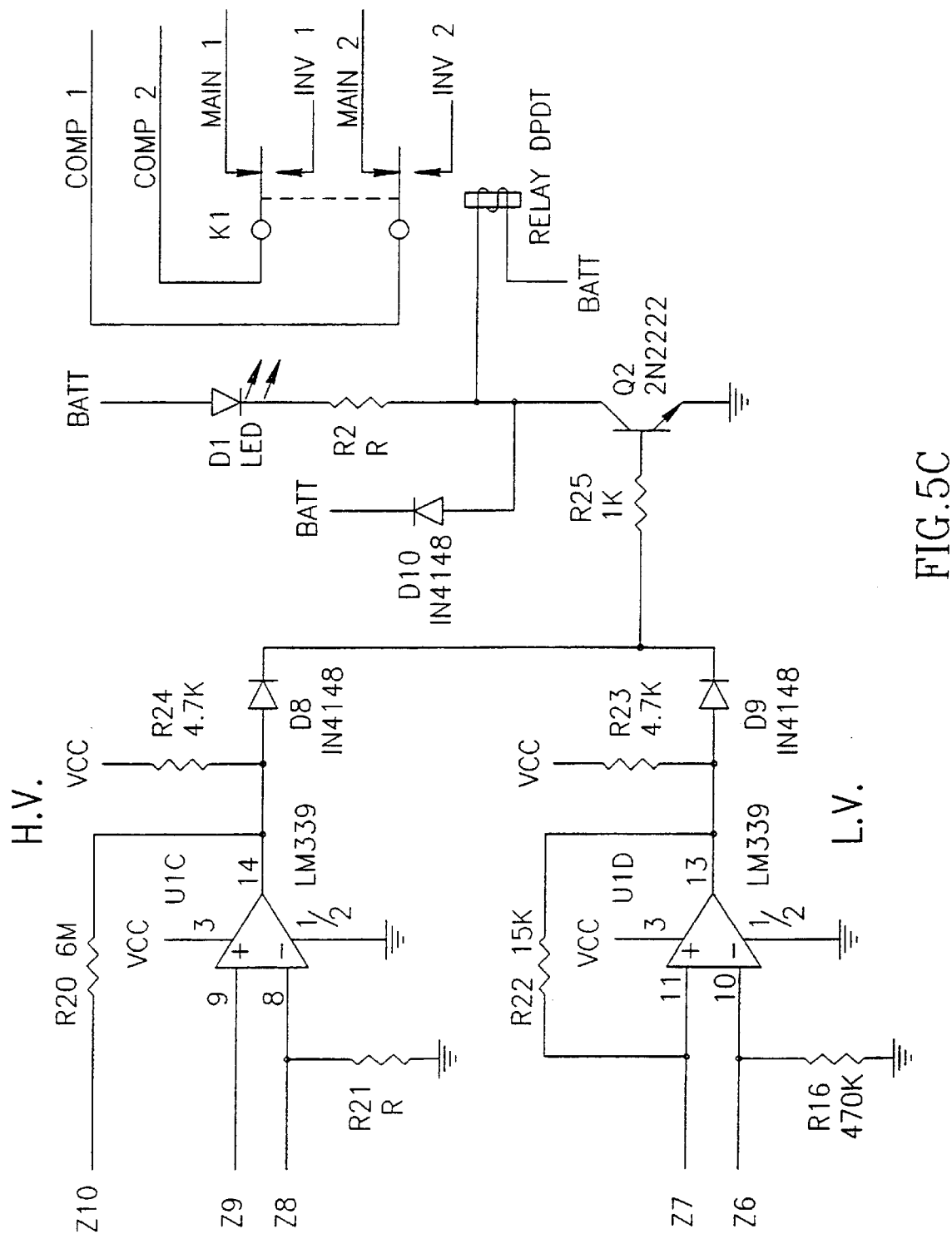

FIGS. 4 and 5 are respectively a schematic block diagram and electronic circuit of an internal UPS card in accordance with the invention. In FIG. 4 the parts A, B, C, D, E, F, G, I and J are shown as a block diagram and the operation is as follows:

The AC mains power goes (via a LITTELE sense PCB transformer—see FIG. 5—T1) to a low voltage detector D and high voltage detector C. A reference voltage J, that can be adjustable, is supplied to the low and high voltage detectors D and C so that they can be set to the desired value. The reference voltage can be set by R6 and R7 multi-turn potentiometer (see FIG. 5). The low and high voltage detection is performed by integrated circuits U1A–D, here shown as LM339 (QUAD OP AMP), that acts as a comparator. When the comparators D or C are active due to high voltage or low voltage AC mains (i.e., outage), the output of the relevant comparator goes high (U1C or U1D pin 13 or 14 in FIG. 5) switching on the transistor Q2 which becomes conductive and point CP (FIG. 5) becomes ground potential. Relay K1 then switches on and changes position so that COMP 1 and COMP 2 (output power to computer and screen) are now connected to INV1 and INV2 points (which will be discussed later) and disconnects from the mains power. The INV 1 and INV 2 points are connected to the output of the DC to DC/AC inverter G. The inverter G (as illustrated in detail in FIG. 6) works with an SG3525 IC that acts as an oscillator that provides 25 kHz square wave pulses on its two output pins 14 and 11. This IC can operate only if pin 10 is grounded.

Pin 10 of the SG3525, called INH (INH=inhibit) is connected to point "CP" (see FIGS. 5C near the K1 relay) so that it becomes active when AC mains power is out of the normal range (this is usually set for a 220V system to: low=196V, high=250V, but can be set to any wanted values). The inverter IC SG3525 starts to oscillate and generates a high DC voltage output with high power that enables the computer and screen to operate for several minutes from the battery power B.

Figure 7:
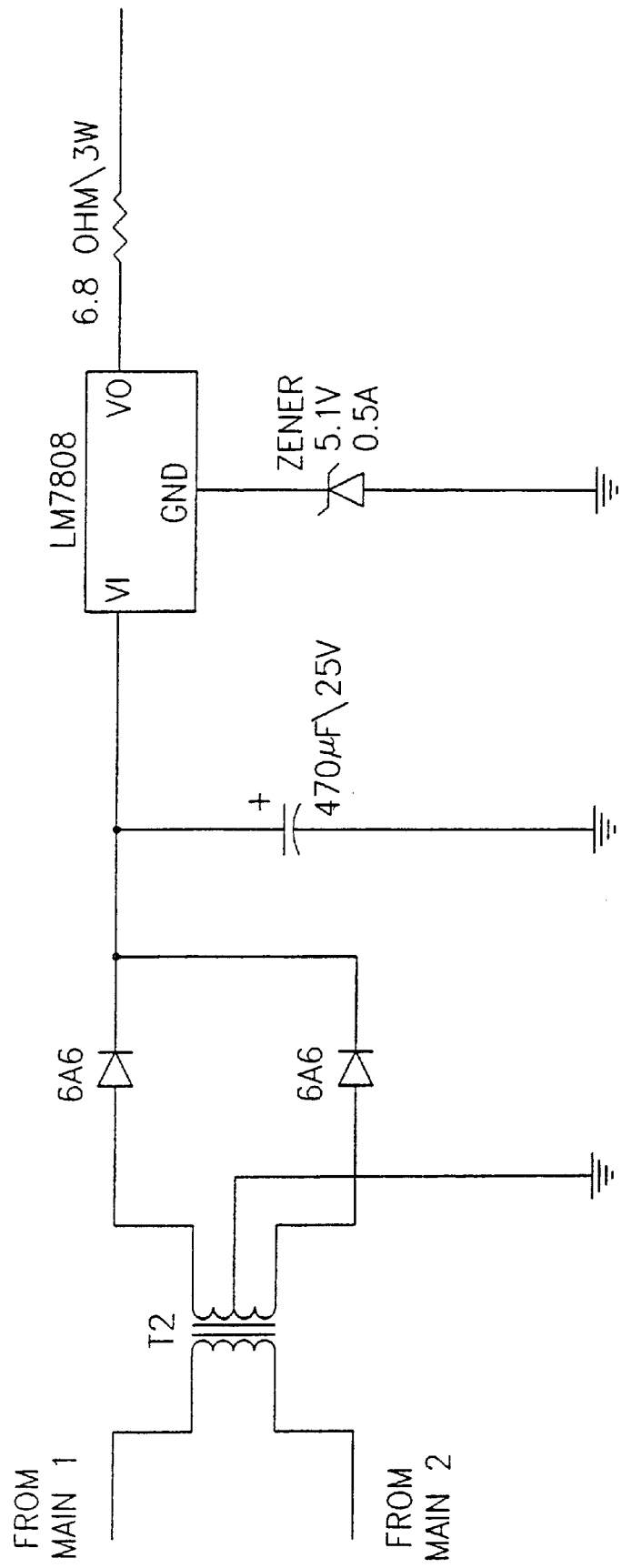
FIG. 7 is a circuit diagram of an automatic charger from main line in accordance with the invention.

As long as the SG3525 IC is not active, ("CP" is high, and no power is taken from battery B.) the battery is charged automatically by the automatic charger A receiving main line power via line 30. The charger's transformer T2 (see FIG. 7) is a small size PCB mounting transformer that provides its output after rectification by two diodes 6A6 and 470UF capacitor, say 16.5 V. This is fed to a regulator, such as LM7808 that together with a Zener diode 5.IV gives a total output voltage of VLM7808+V zener=8+5.1=13.1 V DC. The resistor 6.8 Ohm \3W is to limit the output current to the battery to, say, 150 to 200 mA. This voltage and current charge is a small, say, 12 V \2AH lead acid or other battery. The charger A stops automatically when the battery is fully charged (typically 13.1V) because the potential of the battery became equal to the output of the charger. The charger is always connected to the battery and, when AC mains exist, it charges the battery. When no AC mains exist, it does not affect the battery (discharge), so this unit A (detailed in FIG. 7) is fully independent.

Alternatively charger A can receive power via line 35 from the PC bus slot (FIG. 4), instead of from the mains line 30, and step up the voltage received (5 V) to a higher voltage to charge the battery B. Other output voltages can be obtained by suitably varying the regulator 78XX and V zener.

Figure 6A:
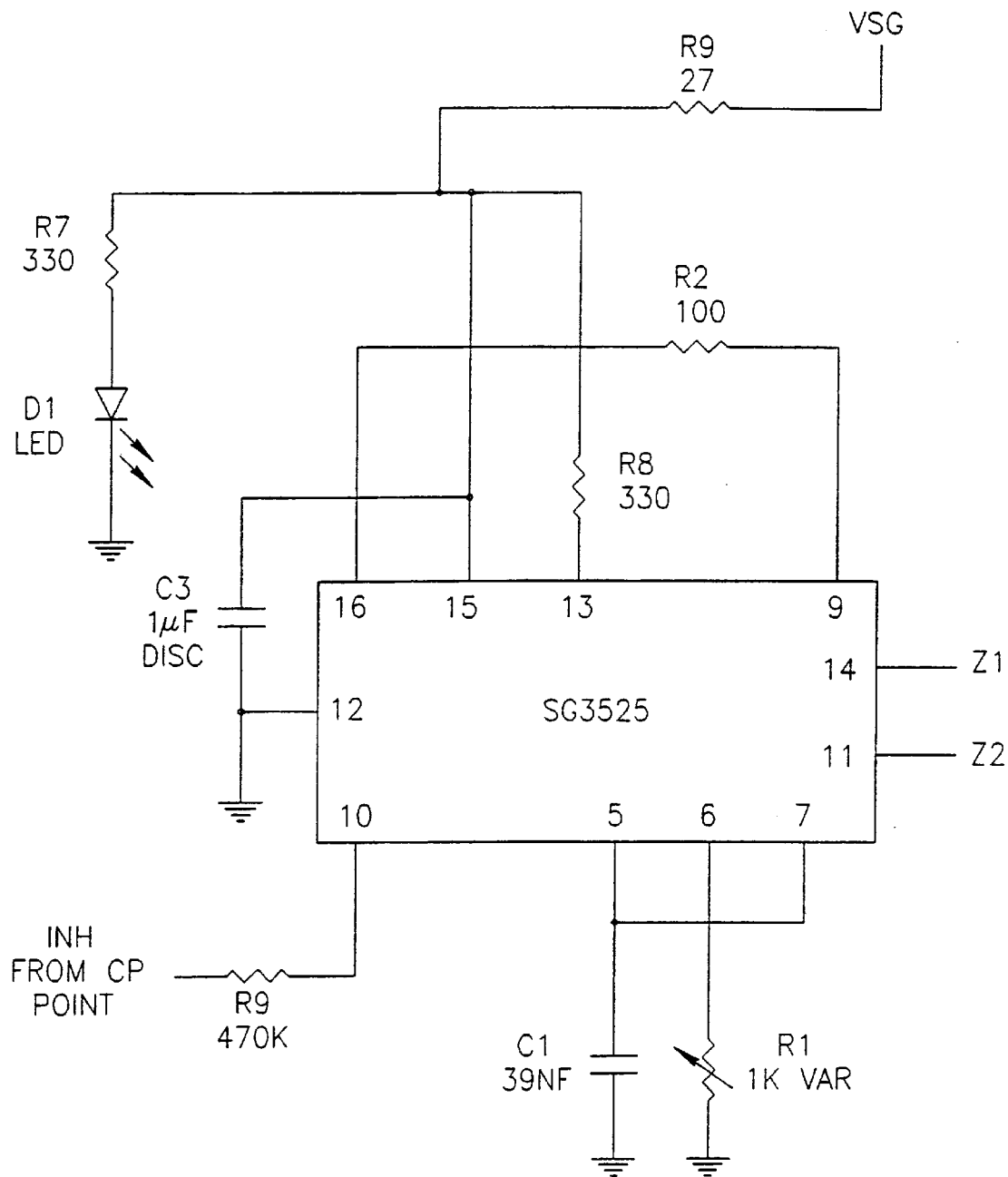
FIGS. 6A–6B represent a schematic diagram of the inverter of the invention.
Figure 6B:
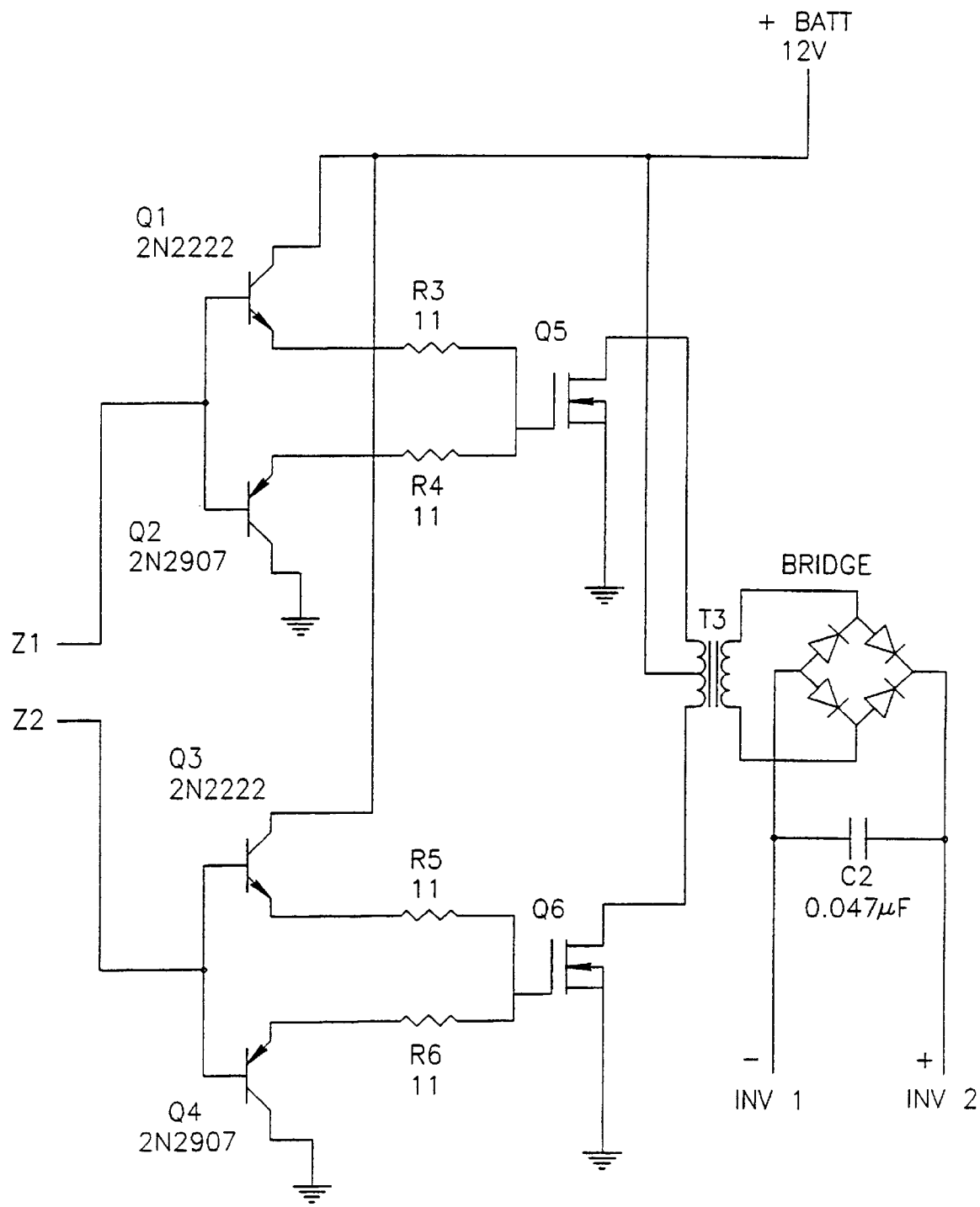

Referring to FIG. 6 (the inverter G of FIG. 4), the output of the SG3525 IC is fed to Mosfet power transistors Q5 and Q6, each via two small transistors Q1, Q2 to drive Q5, and Q3, Q4 to drive Q6. These transistors are to charge\discharge the Mosfets for proper operation. The drain output of the Mosfets are connected to both sides of T3 which is a ferrite low profile transformer (planar transformer for very low profile H=15 mm). One suitable transformer is model number 5557 manufactured by Payton Planar Magnetics Ltd., of Rishon LeZion. The centre of the primary of the transformer is connected to the battery. As long as the Mosfets Q5 and Q6 are not in oscillation, no power is taken from the battery. When SG3525 becomes active, Q5 and Q6 oscillate at high frequency, say 25 KHz (this may be another high frequency between 15 KHz to 200 KHz).

The planar ferrite transformer T3 starts to operate in push-pull and provides in its secondary, a very high voltage AC=280 V \25 KHz with very high efficiency and low losses. The efficiency is better than 92%. The secondary of T3 is fed to a reactifier bridge made up of 4 ultra fast diodes, and together with smoothing capacitor C2 provides a high DC/AC voltage, high power output. This output (from G in FIG. 4) is fed to the K1 relay (also see FIGS. 5C) to points INV1 and INV2.

When the AC mains is low (outage) or high, as explained above, the inverter output is connected to the load (computer and screen). The switching time of the K1 relay is 1 to 3 milli-seconds, so the computer power supply capacitors provide power during this dead time. This time is very short. The change over occurs when the mains power drops to, say, 196 V, so the computer SMPS capacitors are still charged. In this way the computer and screen will remain on and no data will be lost or damaged, because the K1 relay disconnects the computer and screen from the mains when the mains is outside the desired range. The card also protects the hardware against spikes, surges, voltage and "jumps". Thus it proves a full protection solution.

All components are on a printed circuit board that is installed in one of the PC slots. This is made possible because the ferrite transformer has a low profile, i.e. is planar. (The planar transformer has a very low profile=15 mm. Other "regular" ferrites, or any other low profile planar transformer, will also be good). The transformer primary voltage=say, 2×9.8 V for a 12 V battery, the secondary voltage=say, 280 V (can be up to 320 V or so). This voltage is calculated: mains voltage×1.41=maximum of 310 V.

The UPS card has no power switch, so the user does not need to reach to the back of the computer to switch it on. This is also true for transportation of the computer. The only power on or off is the computer power switch.

Figure 8:
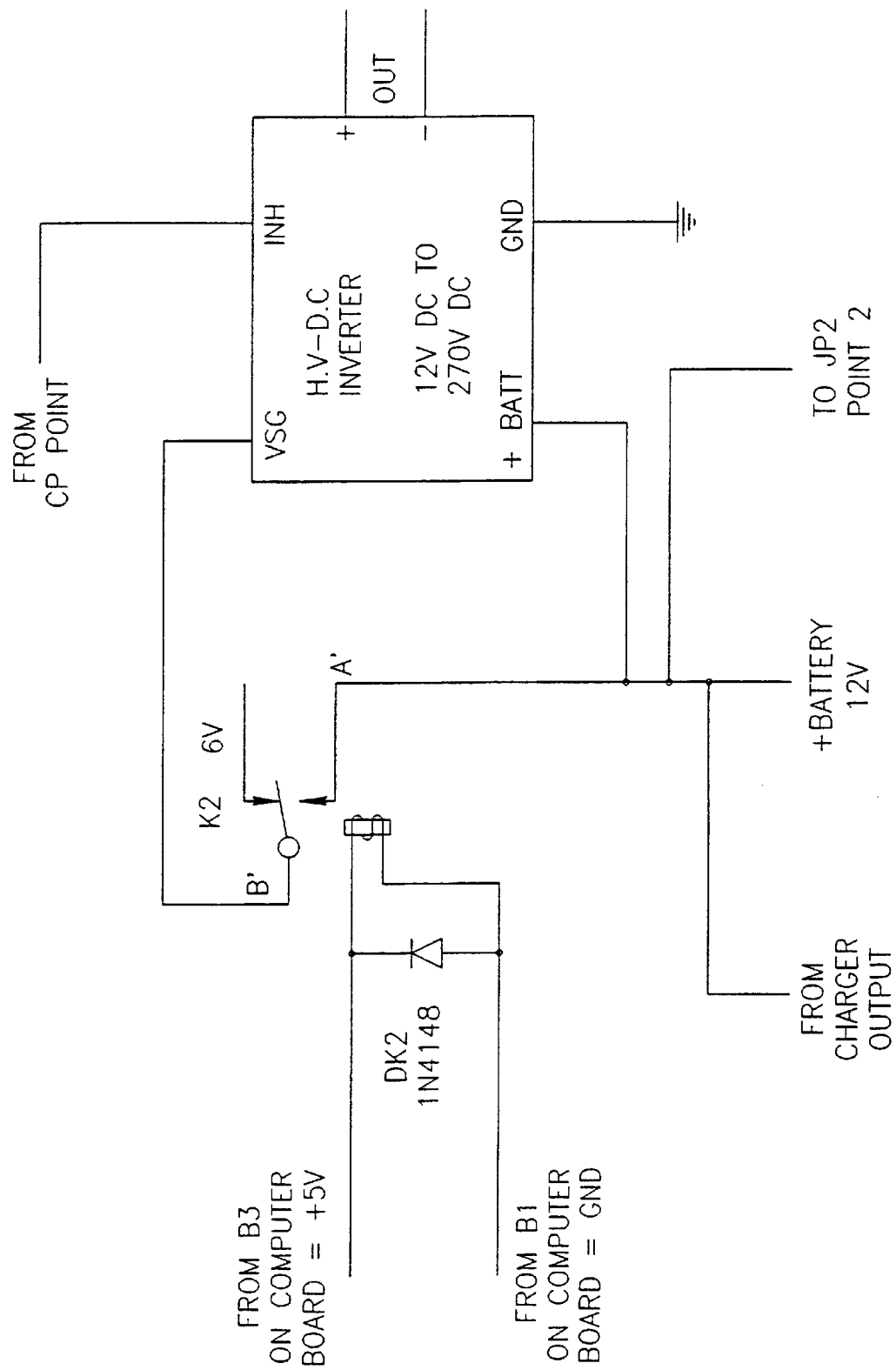
FIG. 8 is a conditional electronic circuit for operating the UPS card.

With reference to FIG. 6, the SG 3525 IC gets its power from a point called VSG. The VSG point is connected to K2 relay point B' on FIG. 8. This relay K2, which is indicated "I" on FIG. 4 and illustrated in detail in FIG. 8, supplies the 12 V power to the IC SG3525 only when the computer is on. This works as follows: the card connected inside the computer receives from the computer board points B1, B31 and B3, B29 (see FIG. 9) 5 V DC (B1, B31=GND and B3, B29=5 V DC) that activates the K2 6 V relay. Other types of connectors such as PCI can also be used to feed the voltage from the SMPS to the step-up inverter/charger (FIG. 10). Points B' and A' of K1 are connected when the PC is switched on (mains power on and normal). A' is connected to the positive terminal of the battery, so B' delivers the battery voltage to the SG3525 IC and enables it. Now, if a power outage occurs, SG3525 detects ground on pin 10 and starts to oscillate and that is only if VSG=9 to 12 V (see FIG. 6). VSG is already at this voltage, as explained. Also, during switching from mains to inverter, the PC motherboard still provides the power to the K2 relay (see FIG. 8) so the inverter is still enabled. With the above conditions, the inverter oscillates to provide backup power to the computer and screen for several minutes. The user can now save the data on the hard disc or other data storage element, and turn off the computer. When the computer is turned off, the PC motherboard does not provide voltage to the inverter (to VSG—FIG. 6) by the K2 relay (FIG. 8) and the inverter is turned off. To operate\enable the inverter again, the user must wait for power to reach the AC mains. If there is no AC mains at the beginning of operation, the UPS card will remain in the off position and can be transported without worry of accidental operation\battery discharge and electric shock. The card can operate only (as stated before) if installed inside the computer and the power switch of the computer is on and AC mains exist.

When the UPS card is off, no current at all flows from the battery. This is important, so that the battery will not discharge when not in use (on the shelf).

The card also has a low battery alarm (U1B in FIG. 5 and E in FIG. 4) that activates an alarm buzzer 45. Comparator U1B compares the battery voltage to reference voltage J in FIG. 4 and R4 in FIG. 5, and when the battery is lower than a pre-determined value (around, say, 10.5 v), the output of U1B becomes high and switches on the Q1 transistor and activates the buzzer 45 to sound an alarm. This warns the user that he has only, say, one minute to shut-down, as will be described further on.

If the user has still not switched off the computer, the auto shut-down system (F in FIG. 4) will do this. This system consists of a comparator U1A (FIG. 5). When the battery goes low to, say, 10 V, the maximum permitted low level, U1A becomes high and via diodes D4 and D5 provides voltage to the comparators of the high\low detectors. This stimulates the return of AC mains and the output of U1C and U1D becomes low. This causes Q2 to be open and the "CP" point goes high, causing the inverter to stop and the relay K1 to release. In this way, no current is now drawn from the battery. This situation changes when the battery is charged again.

The card also has an input noise filter, so the computer is protected against RFI/EMI noise (FIG. 5 top left).

Figure 13:
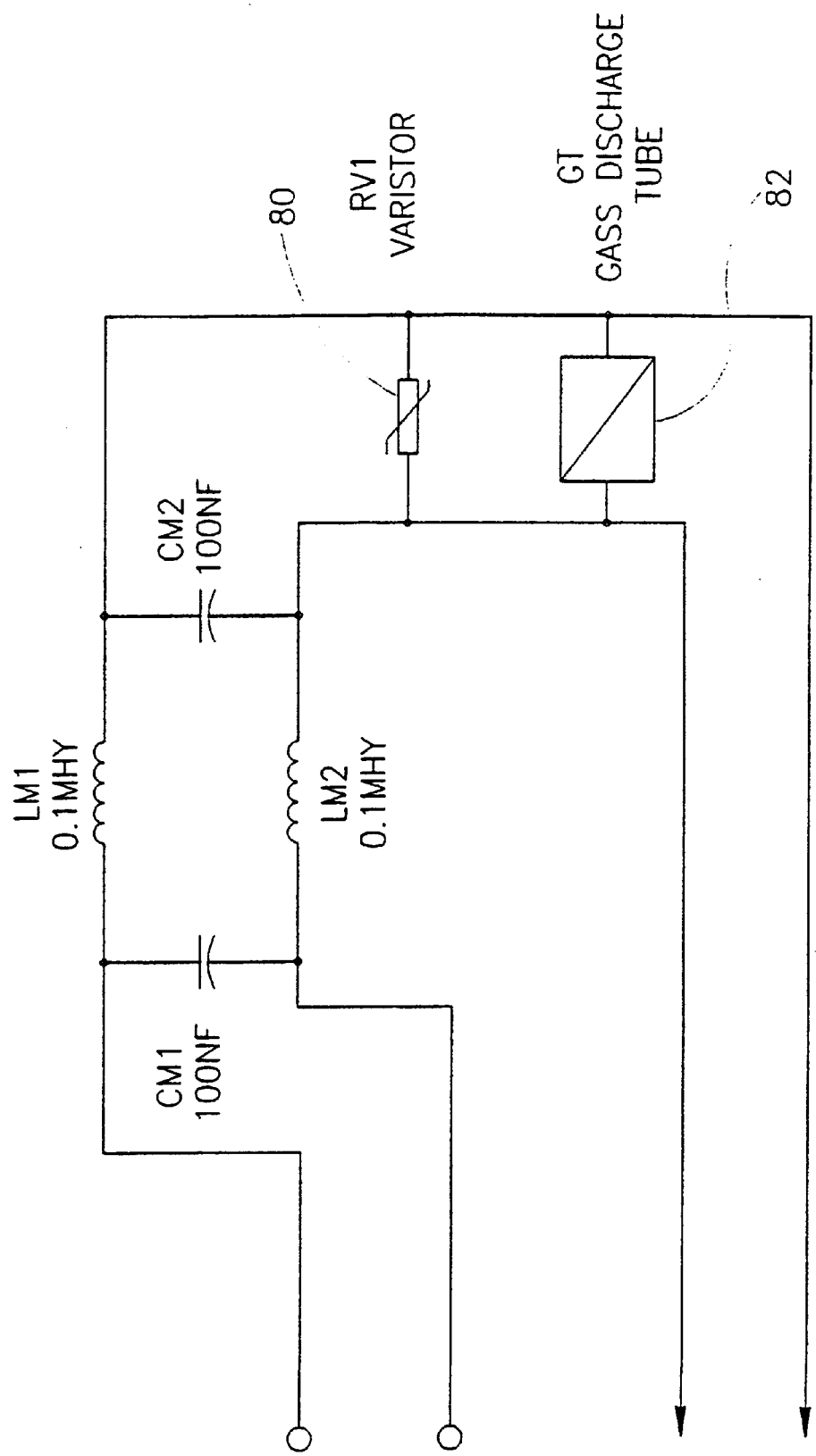
FIG. 13 is a circuit of an RFI/EMI filter with surge protection with reference to RJ1 and RJ2 of FIG. 2b.

The UPS card also includes another RFI/EMI filter (CM1, CM2, LM1 and LM2) with surge protection circuit shown in FIG. 13. This circuit protects the computer from costly hardware damage due to inadvertent accession of high voltage spikes through the phone lines. Connectors RJ1 70 and RJ2 72 (seen in FIGS. 1 and 2b) are the input and output respectively, wherein the phone line is connected to input 70 and output 72 is connected to an external or internal modem/fax to protect the computer from RFI/EMI noises and spikes. A RV1 varistor 80 and GT gas discharge tube 82 (FIG. 13) clamp high voltage spikes in the telephone line.

The following are other differences between the UPS card of this invention and conventional UPS systems:

1. Conventional UPS devices that are capable of operating both computer and screen are separate boxes which are bulky and coupled to the computer as by cables. The UPS card of the present invention, due to its size and design, fits directly into one or two slots inside the computer itself.
2. Most importantly, the DC/DC inverter of this invention is very different from other DC/DC inverters because it provides high voltage power 280 V\120 W that can operate the screen together with the computer. Other UPS cards are unable to operate the screen, as well. The DC/DC converters used, convert to low DC levels to the PC motherboard. Usually they supply +5, –5, +12, –12 V DC and backup only to the computer, not to the screen.
3. In other type UPS cards, because the user cannot see the screen, the card comes together with software that has to be adjusted and suited to the user's software. Therefore installation is much more complicated.
4. The card of this invention also protects the computer hardware against abnormal power voltages (too high, spikes, drop out, etc.).
5. The card is protected against accidental operation. It cannot be operated until it is placed inside the computer.
6. The card does not have a power switch and it is "smart" to operate from the computer power switch, making it easier to use.
7. Because the card is a complete UPS in card size, it is very easy to install. Just plug it in the PC slot, close the computer cover and connect like any "regular" UPS= cable from mains to UPS card and cable from card to computer power supply. From PC power supply there is a connection in parallel to the screen so that preferably no connection to the screen is needed. However, additional output connectors can be provided on the card bracket for direct connection to the screen.
8. The efficiency of the converter is more than 92%, allowing it to use a small size/capacity battery.

Figure 9:
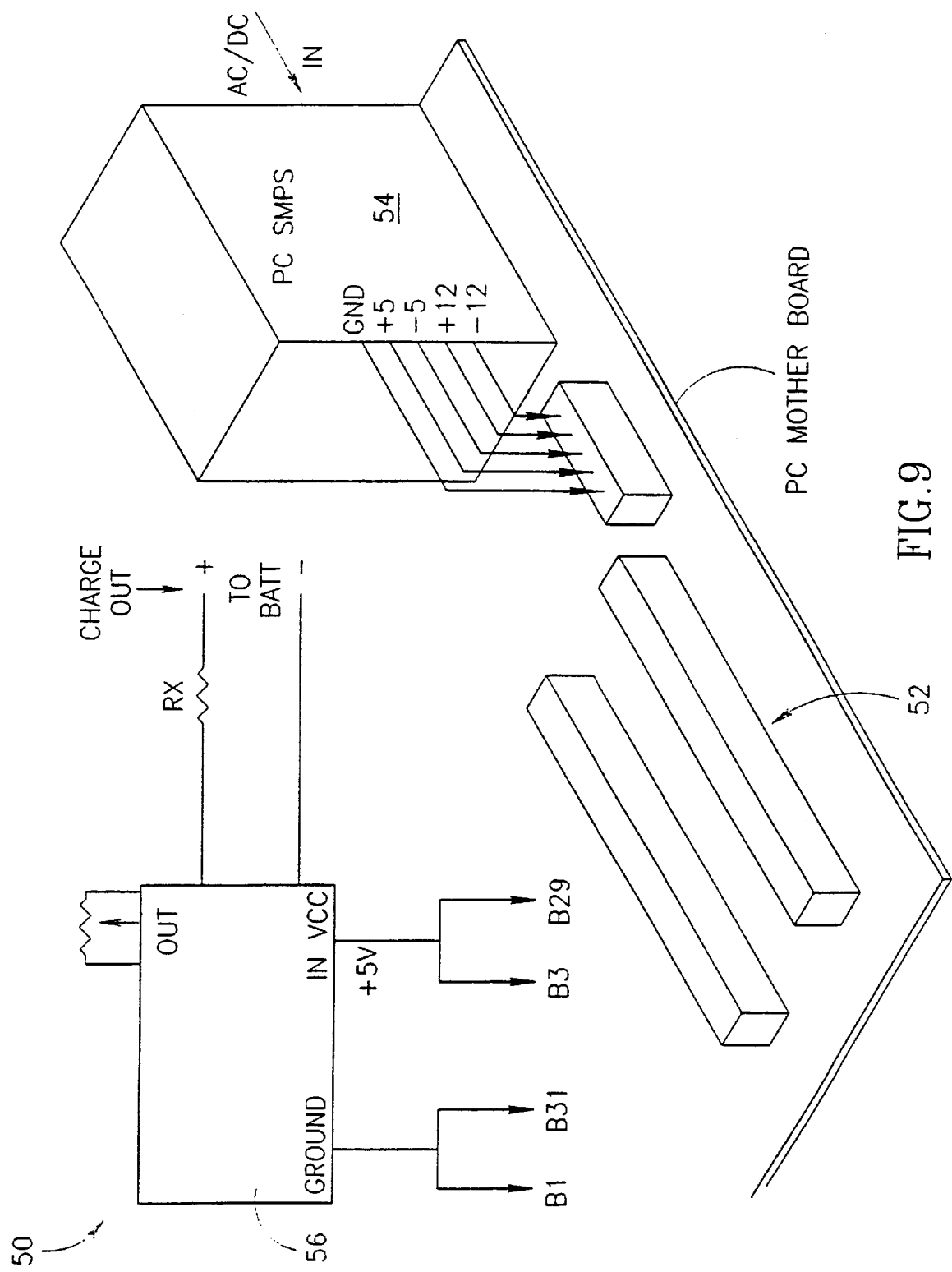
FIG. 9 is a schematic illustration of an alternative battery charger system for use with the UPS card of the invention.
Figure 10:
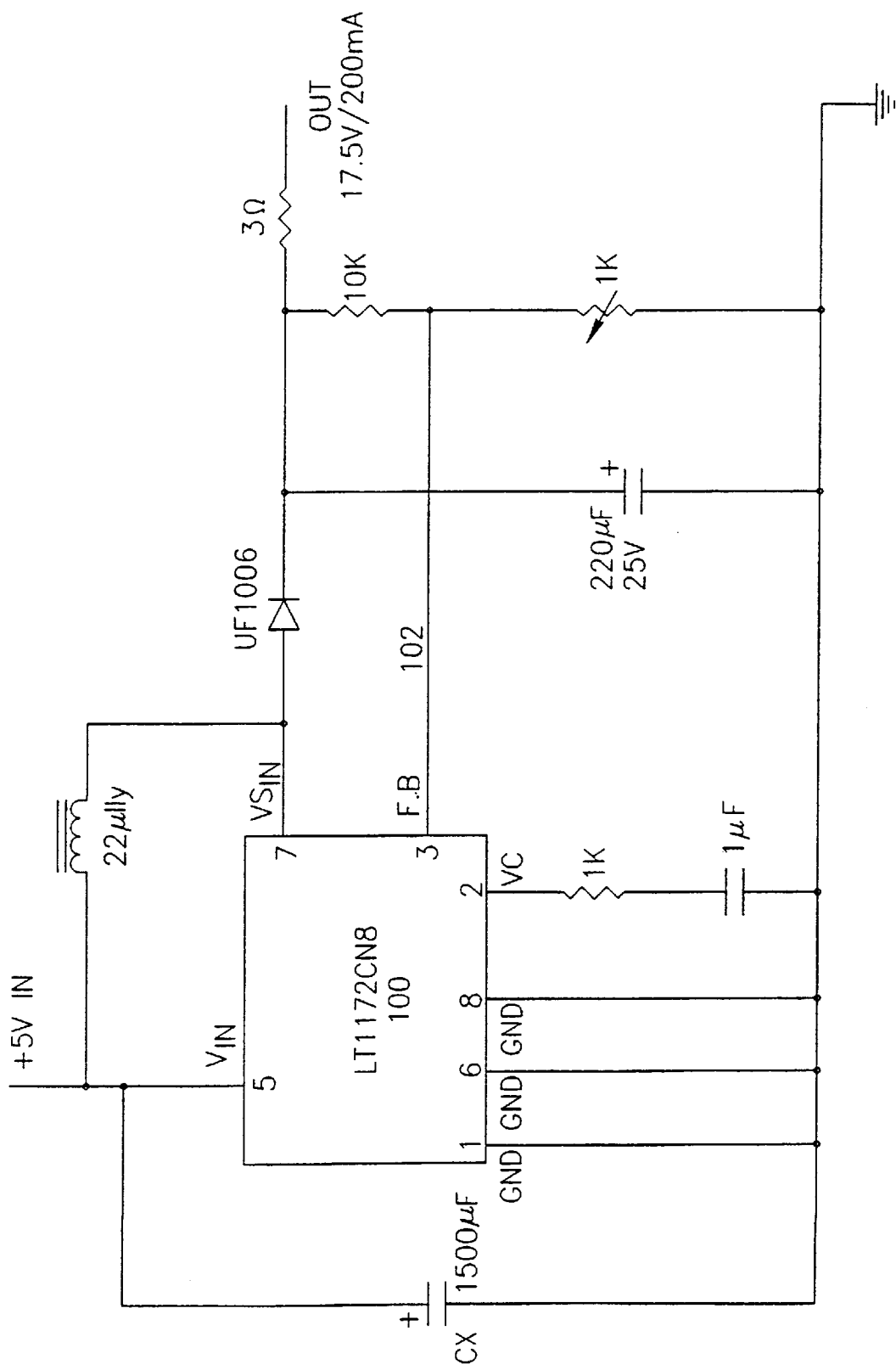
FIG. 10 is a circuit diagram of the battery charger of FIG. 9.

Referring now to FIG. 9, there is shown an alternative battery charger 50. Charger 50 takes power from a PC bus extension slot 52 and uses the 5 V (or 12 V) that came to the PC bus from the PC power supply 54. The Vcc voltage in FIG. 9 is taken from two ground points (pins B1 and B31) and two positive points (pins B3 and B29) for better current flow and to lower the current, and therefore the load, on each pin.

The input current can range from between about 0.5 and 1.2 A. Preferably, each pin provides half the current such as 0.25 A for a total of 0.6 A. This is fed to a step up converter 56, the electronic circuit of which is shown in FIG. 10. Step up converter 56 changes the 5V to voltage that suits the battery (usually 12 to 27 V) and charges the battery. The step up converter 56 has an output current limit resistor (RX) that limits the current charge according to the battery capacity in use (typically 200 mA for 2 AH battery capacity). RX is generally between 1 and 10 ohms, preferably 3 ohms for a battery capacity of 1.8 AH, which will deliver about 200 mA curent. The output is adjustable, as by a potentiometer, between about 5 V and about 24 V, typically preferably 18 V, to charge a battery of 14.4 V nominal voltage or 20 V to charge a battery of 16.8 V nominal voltage as in Ni—Cd sub C batteries.

The circuit shown in FIG. 10 is based on high frequency switching boost converter that switches current over coil (choke). The switching frequency can be in the range of about 20 KHz to about 200 KHz, typically 100 KHz. The integrated circuit that is used has a feedback loop so the output voltage is stable. A capacitor CX is provided to reduce ripple and to extend the time during which the 5 V remains after outage (i.e. during switching from mains to inverter). When the battery is fully charged, the potential of the battery is equal to the potential of the charger and the charge stops. (The current drops from 240 mA to 10 mA is measured with a 12 cell NiCad battery, of 14.4 V nominal voltage). The above makes the charger very small in size. This charger is shown as A in FIG. 4.

Figure 11:
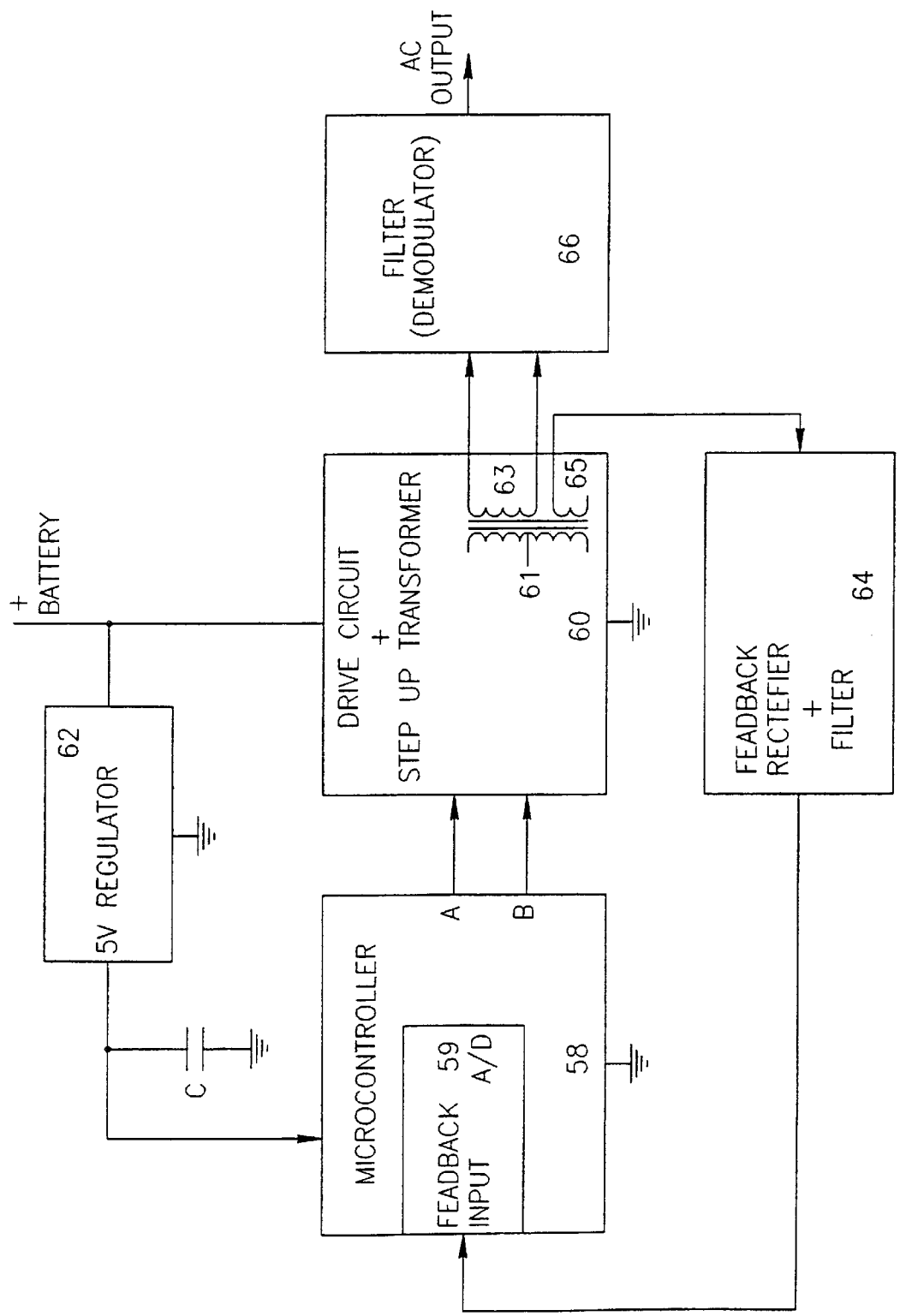
FIG. 11 is a block diagram of a DC to AC inverter in accordance with the invention.
Figure 12:
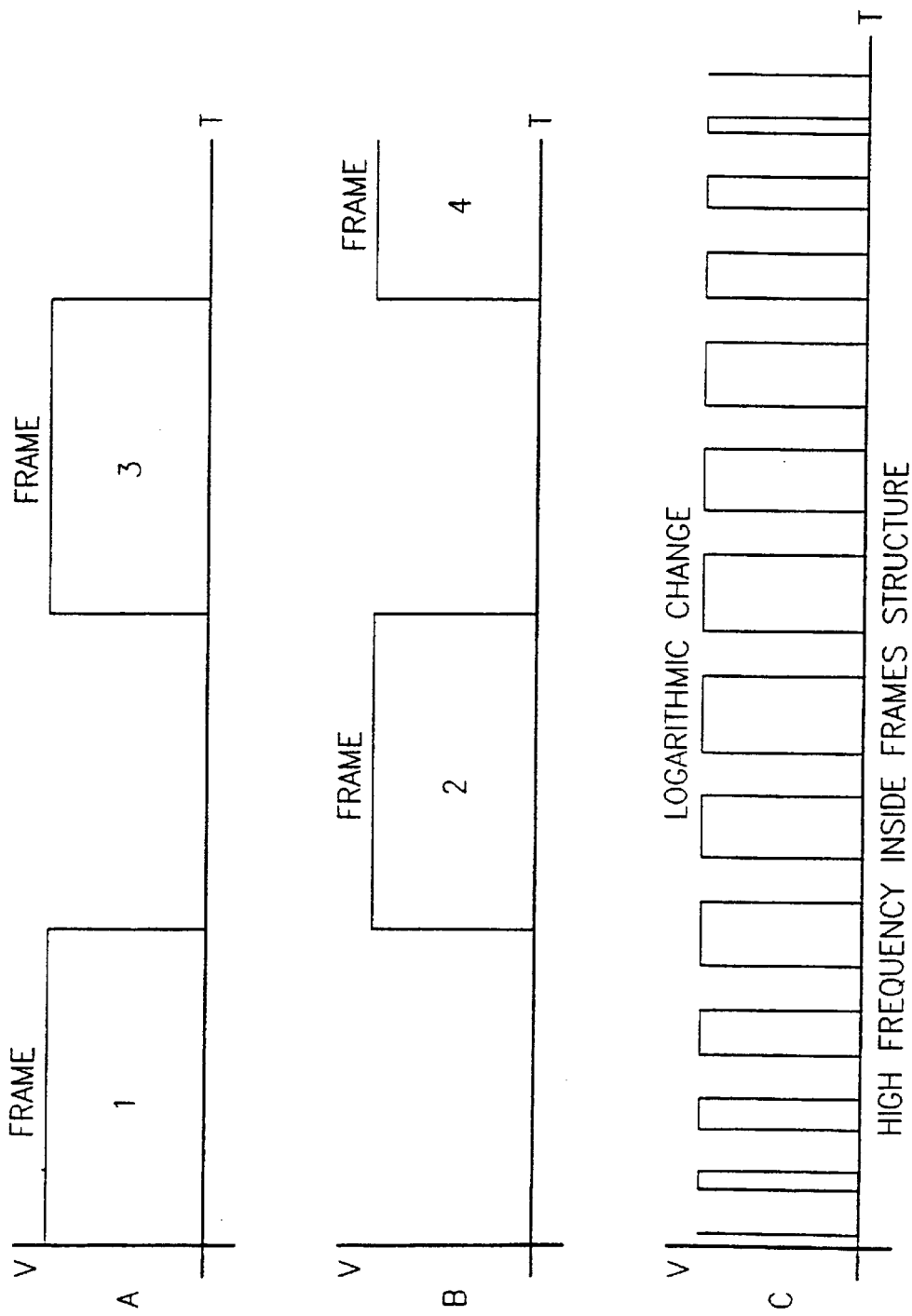
FIG. 12 illustrates the output wave forms generated by the microcontroller of FIG. 11.

Referring now to FIG. 11 there is shown a DC to AC step up inverter (G in FIG. 4). This inverter includes Microchip (TM) microcontroller 58 (PIC 16C73 type) and analog to digital (A/D) converter 59, regulator 62, drive circuit with step up planar transformer 60, filter/demo dulator 66 and feedback rectifier with filter 64. Microcontroller 58 receives regulated 5 V from regulator 62 receiving power from the battery. When there is abnormal power the microcontroller 58, which receives ground signal from point CP, generates output pulses A and B (that their timing is shown in FIG. 12) to logic level Mosfet power transistors (not shown) in drive circuit 60. Each frame/pulse train (A or B) is composed of frequency variable duty cycle pulses C. These pulses being amplified by the step up transformer are fed through the primary winding 61 of the transformer. The secondary winding 63 of the transformer is connected to filter/demodulator 66 which demodulate them to output an AC power. A feedback loop utilizes the output of the transformer from its auxilliary secondary winding 65 and feedback rectifier 64 to produce a correcting feedback pulse which is fed to microcontroller 58, stabilizing the AC output by varying the duty cycle of all the pulses in the pulse trains A and B according to change in load.

It will be appreciated that the invention is not limited to what has been described hereinabove merely by way of example. Rather, the invention is limited solely by the claims which follow.

Software for Microcontroller (FIGS. 11, 12)

```
;
; Timer 0 is used to generate 60 Hz clock
;
; Timer 2 is used to genertae 22 khz PWM clock
;
;************************************************************
;
        LIST    p=16C73         ; PIC16C73 is the target processor
#define option 1
f       equ     1               ; destination = register
w       equ     0               ; destination = w
tmr0    equ     1
status  equ     3
pc      equ     2
intcon  equ     .11
;option equ     1
trisa   equ     5
rp0     equ     5
trisb   equ     6
portb   equ     6
trisc   equ     7
portc   equ     7
gie     equ     7
t0if    equ     2
tmr21e  equ     1
tmr2if  equ     1
tmr2ie  equ     1
go      equ     2
pclath  equ     .10
pir1    equ     .12
pir2    equ     .13
pie1    equ     .12
pie2    equ     .13
tmr2    equ     .17
pr2     equ     .18
t2con   equ     .18
ccpr21  equ     .27
ccpr11  equ     .21
ccp2con equ     .29
adres   equ     .30
adcon0  equ     .31
adcon1  equ     .31
period  equ     .226            ; TIMER 2 226=22khz
dc      equ     .60             ; DUTY CYCLE
main0   equ     D'98'           ; TIMER 0 98=60.6hz
flag    equ     .51
dly     equ     .52
count   equ     .53
upd     equ     .54
result  equ     .55
temp    equ     .56
;
;************************************************************
;       Test Program
;************************************************************
;
begin
;
        org     0H
;       goto    start
        org     140h
start
        clrw
        bcf     status, rp0             ; select bank 0
        bsf     flag, 7                 ; set flag.7 bit
        movlw   main0                   ; timer 0 is set
        movwf   tmr0                    ;       to produce 50hz
        movlw   B'01100000'             ; disable
        movwf   intcon                  ;       all interrupts
        clrf    tmr2                    ; reset timer 2
        movlw   B'00000100'             ; set t2con as
        movwf   t2con                   ; postscaler=1,
                                        timer 2 on, prescaler=1
        movlw   dc                      ; set
        movwf   ccpr21                  ;   timer2 duty cycle midway
        movlw   B'00001100'             ; set ccp2con as
        movwf   ccp2con                 ; PWM mode, 8 bit low resolution
        bsf     status, rp0             ; select bank 1
        bsf     pie1, tmr2ie            ; enable TMR2 to PR2 interrupt bit
        movlw   period                  ; preset
        movwf   pr2                     ;       pr2
        movlw   B'00000000'             ; put port
        movwf   trisc                   ;       'C' output mode
        movwf   trisb                   ;       'B' in output mode
        movlw   B'11111111'             ; put port
        movwf   trisa                   ;       'A' in input mode
        movlw   B'10000110'             ; psa=128, internal clock
        movwf   option                  ;
        call    initad                  ; initialize A2D
        movlw   B'11111111'             ; set rgister
        movwf   dly                     ; dly=255
dd      decfsz  dly, f                  ; loop
        goto    dd                      ;
        bsf     adcon0, go              ; start A2D coversion
        movlw   B'11111111'             ; more delay
        movwf   dly                     ; set register dly=255
ee      decfsz  dly, f                  ; loop
        goto    ee                      ;
        bsf     intcon, gie             ; enables timer 0 + 2 interrupts
loop    nop
        nop
        nop
```

-continued

```
        goto    loop
        org     0H
        goto    start
;
;       start of interrupt routine
;
        org     0004H
        bcf     status, rp0         ; select bank 0
        btfss   intcon, tmr2if      ; timer 2 interrupt ?
        goto    xx
        btfsc   flag, 6             ; 1=UP or 0=DOWN
        incf    upd                 ; increment upd
        btfss   flag, 6             ; 1=UP or 0=DOWN
        decf    upd                 ; decrement upd
        movf    upd, w
        movwf   temp
        rrf     temp, f
        rrf     temp, w
        andlw   0x1f
        iorwf   result, w
        call    table
        movwf   ccpr21
        bcf     pirl, tmr2if        ; clear timer 2 interrupt flag
xx      btfss   intcon, t0if        ; if timer 0 overflow
        retfie                      ; else exit
        movlw   main0
        movwf   tmr0
        bcf     intcon, t0if        ; clear timer 0 overflow flag
        incf    count, f            ; increment register COUNT
        btfsc   count, 0            ; if count.0=1 then
                                    flag.6=0 -> DOWN
        bcf     flag, 6             ;
        btfsc   count, 0            ; continue if count=even
        retfie                      ; exit
        bsf     flag, 6             ; if count.0=0 then flag.6=1 -> up
        movlw   .255                ; toggle port B
        xorwf   portb, f            ;
        clrf    upd                 ; clear up-down
;       movf    adres, w
        movlw   0x0e0                       ; just for debugging
        andlw   0xe0
        movwf   result
        btfsc   adcon0, go          ; see if a2d is finished
        retfie                      ; exit
;       movf    adres, w
        movlw   0x0e0                       ; just for debugging
        andlw.  0xe0
        movwf   result
        bsf     adcon0, go          ; start a2d
        retfie                      ; exit
;
; init A2D
;
; initad
        bsf     status, rp0         ; select bank 1
        movlw   B'00000001'         ; ra3=ref, all
                                    A inputs analog
        movwf   adcon1              ;
        bcf     status, rp0         ; select bank 0
        movlw   B'10000001'         ; adon is on,
                                    channel 0,
                                    osc=32
        movwf   adcon0
        return
        org     4.00h
table
        addwf   pc                  ; w=offset
        retlw   .230                ; 0          0x
        retlw   .225                ; 1
        retlw   .220                ; 2
        retlw   .215                ; 3
        retlw   .210                ; 4
        retlw   .205                ; 5
        retlw   .200                ; 6
        retlw   .195                ; 7
        retlw   .190                ; 8
        retlw   .185                ; 9
        retlw   .180                ; 10
        retlw   .175                ; 11
        retlw   .170                ; 12
        retlw   .165                ; 13
        retlw   .160                ; 14
        retlw   .155                ; 15
        retlw   .150                ; 16
        retlw   .145                ; 17
        retlw   .140                ; 18
        retlw   .135                ; 19
        retlw   .130                ; 20
        retlw   .125                ; 21
        retlw   .120                ; 22
        retlw   .115                ; 23
        retlw   .110                ; 24
        retlw   .105                ; 25
        retlw   .95                 ; 26
        retlw   .90                 ; 27
        retlw   .85                 ; 28
        retlw   .80                 ; 29
        retlw   .75                 ; 30
        retlw   .70                 ; 31
        retlw   .130                ; 32         20x
        retlw   .125                ; 33
        retlw   .120                ; 34
        retlw   .115                ; 35
        retlw   .181                ; 112
        retlw   .181                ; 113
        retlw   .179                ; 114
        retlw   .179                ; 115
        retlw   .177                ; 116
        retlw   .177                ; 117
        retlw   .175                ; 118
        retlw   .175                ; 119
        retlw   .173                ; 120
        retlw   .173                ; 121
        retlw   .171                ; 122
        retlw   .171                ; 123
        retlw   .169                ; 124
        retlw   .169                ; 125
        retlw   .165                ; 126
        retlw   .165                ; 127
        retlw   .124                ; 128        80x
        retlw   .124                ; 129
        retlw   .124                ; 130
        retlw   .121                ; 131
        retlw   .121                ; 132
        retlw   .121                ; 133
        retlw   .121                ; 134
        retlw   .119                ; 135
        retlw   .119                ; 136
        retlw   .119                ; 137
        retlw   .116                ; 138
        retlw   .116                ; 139
        retlw   .116                ; 140
        retlw   .113                ; 141
        retlw   .113                ; 142
        retlw   .113                ; 143
        retlw   .110                ; 144
        retlw   .110                ; 145
        retlw   .110                ; 146
        retlw   .107                ; 147
        retlw   .107                ; 148
        retlw   .107                ; 149
        retlw   .104                ; 150
        retlw   .104                ; 151
        retlw   .104                ; 152
        retlw   .101                ; 153
        retlw   .101                ; 154
        retlw   .101                ; 155
        retlw   .98                 ; 156
        retlw   .98                 ; 157
        retlw   .98                 ; 158
        retlw   .98                 ; 159
        retlw   .130                ; 160        0a0x
        retlw   .130                ; 161
        retlw   .130                ; 162
        retlw   .125                ; 163
        retlw   .125                ; 164
        retlw   .125                ; 165
        retlw   .120                ; 166
```

-continued

| | | |
|---|---|---|
| retlw | .120 | ; 167 |
| retlw | .120 | ; 168 |
| retlw | .115 | ; 169 |
| retlw | .115 | ; 170 |
| retlw | .115 | ; 171 |
| retlw | .110 | ; 172 |
| retlw | .110 | ; 173 |
| retlw | .110 | ; 174 |
| retlw | .105 | ; 175 |
| retlw | .105 | ; 176 |
| retlw | .105 | ; 177 |
| retlw | .100 | ; 178 |
| retlw | .100 | ; 179 |
| retlw | .100 | ; 180 |
| retlw | .95 | ; 181 |
| retlw | .95 | ; 182 |
| retlw | .95 | ; 183 |
| retlw | .90 | ; 184 |
| retlw | .90 | ; 185 |
| retlw | .90 | ; 186 |
| retlw | .85 | ; 187 |
| retlw | .85 | ; 188 |
| retlw | .85 | ; 189 |
| retlw | .80 | ; 190 |
| retlw | .80 | ; 191 |
| retlw | .200 | ; 192    0c0x |
| retlw | .200 | ; 193 |
| retlw | .200 | ; 194 |
| retlw | .200 | ; 195 |
| retlw | .200 | ; 196 |
| retlw | .200 | ; 197 |
| retlw | .190 | ; 198 |
| retlw | .190 | ; 199 |
| retlw | .190 | ; 200 |
| retlw | .190 | ; 201 |
| retlw | .190 | ; 202 |
| retlw | .190 | ; 203 |
| retlw | .180 | ; 204 |
| retlw | .180 | ; 205 |
| retlw | .180 | ; 206 |
| retlw | .180 | ; 207 |
| retlw | .180 | ; 208 |
| retlw | .180 | ; 209 |
| retlw | .170 | ; 210 |
| retlw | .170 | ; 211 |
| retlw | .170 | ; 212 |
| retlw | .170 | ; 213 |
| retlw | .170 | ; 214 |
| retlw | .170 | ; 215 |
| retlw | .160 | ; 216 |
| retlw | .160 | ; 217 |
| retlw | .160 | ; 218 |
| retlw | .160 | ; 219 |
| retlw | .160 | ; 220 |
| retlw | .160 | ; 221 |
| retlw | .160 | ; 222 |
| retlw | .160 | ; 223 |
| retlw | .130 | ; 224    e0x |
| retlw | .125 | ; 225 |
| retlw | .120 | ; 226 |
| retlw | .115 | ; 227 |
| retlw | .110 | ; 228 |
| retlw | .105 | ; 229 |
| retlw | .100 | ; 230 |
| retlw | .95 | ; 231 |
| retlw | .90 | ; 232 |
| retlw | .85 | ; 233 |
| retlw | .80 | ; 234 |
| retlw | .75 | ; 235 |
| retlw | .70 | ; 236 |
| retlw | .65 | ; 237 |
| retlw | .60 | ; 238 |
| retlw | .55 | ; 239 |
| retlw | .50 | ; 240 |
| retlw | .45 | ; 241 |
| retlw | .40 | ; 242 |
| retlw | .35 | ; 243 |
| retlw | .30 | ; 244 |
| retlw | .25 | ; 245 |

-continued

| | | |
|---|---|---|
| retlw | .20 | ; 246 |
| retlw | .15 | ; 247 |
| retlw | .10 | ; 248 |
| retlw | .5 | ; 249 |
| retlw | .0 | ; 250 |
| retlw | .255 | ; 251 |
| retlw | .250 | ; 252 |
| retlw | .245 | ; 253 |
| retlw | .240 | ; 254 |
| retlw | .235 | ; 255 |
| org | 700h | |
| goto | begin | |
| retlw | .110 | ; 36 |
| retlw | .105 | ; 37 |
| retlw | .100 | ; 38 |
| retlw | .95 | ; 39 |
| retlw | .90 | ; 40 |
| retlw | .85 | ; 41 |
| retlw | .80 | ; 42 |
| retlw | .75 | ; 43 |
| retlw | .70 | ; 44 |
| retlw | .65 | ; 45 |
| retlw | .60 | ; 46 |
| retlw | .55 | ; 47 |
| retlw | .50 | ; 48 |
| retlw | .45 | ; 49 |
| retlw | .40 | ; 50 |
| retlw | .35 | ; 51 |
| retlw | .30 | ; 52 |
| retlw | .25 | ; 53 |
| retlw | .20 | ; 54 |
| retlw | .15 | ; 55 |
| retlw | .10 | ; 56 |
| retlw | .5 | ; 57 |
| retlw | .0 | ; 58 |
| retlw | .255 | ; 59 |
| retlw | .250 | ; 60 |
| retlw | .245 | ; 61 |
| retlw | .240 | ; 62 |
| retlw | .235 | ; 63 |
| retlw | .230 | ; 64    40x |
| retlw | .220 | ; 65 |
| retlw | .210 | ; 66 |
| retlw | .200 | ; 67 |
| retlw | .190 | ; 68 |
| retlw | .180 | ; 69 |
| retlw | .170 | ; 70 |
| retlw | .160 | ; 71 |
| retlw | .150 | ; 72 |
| retlw | .140 | ; 73 |
| retlw | .130 | ; 74 |
| retlw | .120 | ; 75 |
| retlw | .110 | ; 76 |
| retlw | .100 | ; 77 |
| retlw | .90 | ; 78 |
| retlw | .80 | ; 79 |
| retlw | .70 | ; 80 |
| retlw | .60 | ; 81 |
| retlw | .50 | ; 82 |
| retlw | .40 | ; 83 |
| retlw | .20 | ; 84 |
| retlw | .10 | ; 85 |
| retlw | .0 | ; 86 |
| retlw | .245 | ; 87 |
| retlw | .235 | ; 88 |
| retlw | .235 | ; 89 |
| retlw | .235 | ; 90 |
| retlw | .235 | ; 91 |
| retlw | .235 | ; 92 |
| retlw | .235 | ; 93 |
| retlw | .235 | ; 94 |
| retlw | .235 | ; 95 |
| retlw | .197 | ; 96    60x |
| retlw | .197 | ; 97 |
| retlw | .195 | ; 98 |
| retlw | .195 | ; 99 |
| retlw | .193 | ; 100 |
| retlw | .193 | ; 101 |
| retlw | .191 | ; 102 |

-continued

| | | |
|---|---|---|
| retlw | .191 | ; 103 |
| retlw | .189 | ; 104 |
| retlw | .189 | ; 105 |
| retlw | .187 | ; 106 |
| retlw | .187 | ; 107 |
| retlw | .185 | ; 108 |
| retlw | .185 | ; 109 |
| retlw | .183 | ; 110 |
| retlw | .183 | ; 111 |
| org | 900h | |
| goto | begin | |
| end | | |

What is claimed is:

1. An off-line uninterrupted power supply (UPS) for a computer having a data storage element and an associated monitor, the computer operating on power supplied by an internal switch mode power supply (SMPS) system receiving line power, characterized in that said UPS consists of an internal device for installation inside the computer and said internal device mains AC power and protection to the computer and to the monitor from power abnormalities and noises and in the event of a line failure provides AC power produced by the off-line UPS internal circuits to the computer and monitor.

2. A UPS as in claim 1 characterized in that the UPS device is an internal card.

3. A UPS according to claim 2 sized to permit it to fit into a single bus slot of a computer.

4. A UPS card according to claim 2, wherein a charger receives low voltage from a computer bus slot via two or more bus pins for each of ground and +V respectively, thereby reducing current flow through each pin and relevant conductors on a mother board.

5. A UPS card according to claim 2 comprising as a battery charger a step-up inverter/charger receiving a low voltage from a bus slot and that steps up said low voltage to a higher voltage to charge a higher voltage battery.

6. A UPS card as in claim 5 wherein the low voltage received by the step-up inverter/charger is between 3–12 volts and the higher voltage in between 5–27 volts.

7. A UPS for a computer, as in claim 1 characterized in that the UPS is installed in the switch mode power supply (SMPS) of the computer.

8. A UPS according to claim 1, comprising a planar transformer, high frequency oscillator, power transistors, rectifier and smoothing capacitor.

9. A UPS according to claim 8, wherein said planar transformer is a ferrite step-up transformer.

10. A UPS according to claim 1 and further comprising means for downloading communication software.

11. A UPS as in claim 1, further comprising telephone line connectors and protection of the computer against RFI/EMI noises and spikes coming from a telephone line.

12. A UPS as in claim 11, wherein a UPS card is coupled to the telephone line and to a fax/modem card via a short jumper cable.

13. A computer system comprising a computer and screen and internal UPS in accordance with claim 1.

14. A computer system as claimed in claim 13, wherein a UPS card is coupled to an AC mains line, and said UPS card is also coupled to an internal power supply of said computer via a short jumper cable.

15. An off-line internal UPS providing an internal DC power output of 200–320 volts and AC power output of 220/110 V 50/60 Hz respectively, comprising a printed circuit board, a battery, an automatic battery charger, a DC to DC and a DC to AC high voltage inverter that oscillates in the range of 15 to 200 KHz, low and high voltage detectors and a change over switch/relay for providing mains AC power and AC power internally produced by said off-line UPS, all mounted on said board, said internal off-line UPS being activated by the computer on/off switch.

16. An internal UPS as in claim 15, activated by a separate on/off switch.

17. A UPS according to claim 15 and further comprising low battery alarm means, and automatic shut-off means operative when a voltage in the battery falls below a pre-determined acceptable level.

18. A UPS according to claim 15, providing AC power output of 220/110 V 50/60 Hz respectively, wherein the DC and AC high voltage inverter comprises a micro-controller and an A/D converter.

19. An off-line uninterruptible power supply (UPS) for a personal computer, which receives line power and has a video display monitor coupled thereto, the computer having an internal bus and a plurality of mutually parallel slots on the bus with a predetermined spacing therebetween for insertion of extension cards thereinto, the UPS comprising:
a printed circuit card having circuit components mounted thereon which is inserted into one of the plurality of slots, such that a width of the printed circuit card including the circuit components is generally equal to or less than the predetermined spacing of the slots, and which provides mains AC power to the personal computer and the display monitor and in the event of a failure of the line power provides AC power internally produced by the off-line UPS internal circuits.

20. A UPS according to claim 19, wherein the circuit components mounted on the printed circuit card include one or more batteries.

21. A UPS according to claim 19, wherein the circuit components mounted on the printed circuit card include a planar transformer.

22. A UPS according to claim 19, wherein the printed circuit card is actuated responsive to a bus voltage received via the slot into which it is inserted, such that the UPS is inactive when removed from the slot.

23. A UPS according to claim 19, wherein the bus comprises an industry-standard personal computer bus.

24. A UPS according to claim 19, wherein the circuit components mounted on the printed circuit card include input and output connectors for the lines power, wherein the personal computer and the monitor receive power from the lines power output connector.

25. A UPS according to claim 24, wherein the input and output connectors are accessible at a panel of the personal computer for attachment of power cables thereto.

26. An off-line uninterruptible power supply (UPS) for a personal computer, which operates on line power, the computer having an internal bus and a plurality of mutually parallel slots on the bus for insertion of extention cards thereinto, the UPS comprising:
a printed circuit card having circuit components mounted thereon which is inserted into at least one of the plurality of slots, which card provides main AC power to the personal computer and in the event of a failure of the line power provides AC power internally produced by the off-line UPS internal circuits, the components including a line power input connector accessible at a panel of the personal computer, through which connector the off-line UPS and the computer receive the line power.

27. A UPS according to claim 26, wherein a video display monitor is coupled to the computer, and wherein the components on the card include a lines power output connector from which the computer and the display receive the lines power.

28. A UPS according to claim 26, wherein the plurality of mutually parallel slots have a predetermined spacing therebetween, and wherein the input connector has a width in a direction perpendicular to a plane of the card that is substantially less than a predetermined spacing.

29. A UPS according to claim 28, wherein the bus comprises an industry-standard personal computer bus.

* * * * *